United States Patent
Mueller et al.

(10) Patent No.: US 12,171,173 B2
(45) Date of Patent: Dec. 24, 2024

(54) FLOWER STEM INSERTION DEVICE FOR FORMING FLOWER BOUQUETS

(71) Applicants: Elaine Mueller, Minooka, IL (US); Robert Butta, Cedar Lake, IN (US)

(72) Inventors: Elaine Mueller, Minooka, IL (US); Robert Butta, Cedar Lake, IN (US)

( * ) Notice: Subject to any disclaimer, the term of this patent is extended or adjusted under 35 U.S.C. 154(b) by 769 days.

(21) Appl. No.: 16/718,670

(22) Filed: Dec. 18, 2019

(65) Prior Publication Data

US 2020/0187424 A1    Jun. 18, 2020

Related U.S. Application Data

(60) Provisional application No. 62/781,152, filed on Dec. 18, 2018.

(51) Int. Cl.
| | | |
|---|---|---|
| *A01G 5/02* | (2006.01) | |
| *A47G 7/02* | (2006.01) | |
| *A47G 7/07* | (2006.01) | |

(52) U.S. Cl.
CPC ............ *A01G 5/02* (2013.01); *A47G 7/02* (2013.01); *A47G 7/07* (2013.01)

(58) Field of Classification Search
CPC ... A01G 5/02; A01G 5/04; A47G 7/02; A47G 7/07
USPC ..................... 47/41.01, 4.11–41.13
See application file for complete search history.

(56) References Cited

U.S. PATENT DOCUMENTS

| | | | | |
|---|---|---|---|---|
| 1,491,926 A | * | 4/1924 | Rosenwald ............ | A47G 7/07 47/41.11 |
| 2,981,033 A | * | 4/1961 | Cheetwood ............ | A01G 5/04 47/41.12 |
| 3,336,697 A | * | 8/1967 | Davis .................... | A01G 5/04 47/41.12 |
| 3,630,811 A | * | 12/1971 | Radus ................... | A41G 1/00 206/423 |
| 3,651,601 A | * | 3/1972 | La Montagne .......... | A47G 7/07 47/41.12 |

(Continued)

FOREIGN PATENT DOCUMENTS

| | | | | |
|---|---|---|---|---|
| EP | 0694275 A1 | * | 1/1996 | ............... A47G 7/07 |
| EP | 3058809 A1 | * | 8/2016 | ............... A01G 5/04 |

(Continued)

OTHER PUBLICATIONS

US 2018/0220590 A1, US 2015/0059240 A1; and US 2003/0089033 A1.

*Primary Examiner* — Monica L Perry
*Assistant Examiner* — Aaron M Rodziwicz
(74) *Attorney, Agent, or Firm* — Donald G. Flaynik

(57) ABSTRACT

A flower stem insertion device for forming flower bouquets includes an outer portion fabricated from a relatively flexible polymer material and having a plurality of apertures disposed to ultimately configure a preselected flower bouquet when stem portions of preselected flowers are inserted through the apertures. The flower stem insertion device further includes a deformable inner portion fabricated from Floral foam configured to cooperate with the outer portion such that when the stem portions of the preselected flowers are ultimately inserted through the apertures, the stem portions penetrate the deformable inner portion a predetermined distance sufficient to maintain the position of each preselected flower relative to the outer portion.

8 Claims, 39 Drawing Sheets

(56) References Cited

U.S. PATENT DOCUMENTS

| | | | | |
|---|---|---|---|---|
| 3,768,202 A * | 10/1973 | Wheelock | ............... | A47G 7/07 473/612 |
| 5,853,827 A * | 12/1998 | Wise | ............... | A01G 5/04 428/23 |
| 6,189,261 B1 * | 2/2001 | Helgeson | ............... | A47G 7/07 47/41.01 |
| 8,701,342 B2 | 4/2014 | Malavenda | | |
| 8,708,166 B1 * | 4/2014 | Crouch | ............... | A47G 19/00 211/85.4 |
| D719,872 S * | 12/2014 | Carter | ............... | D11/154 |
| D850,322 S * | 6/2019 | Harshman | ............... | D11/143 |
| 2003/0150158 A1 * | 8/2003 | Wright | ............... | A01G 5/04 47/41.12 |
| 2003/0192958 A1 * | 10/2003 | Miyagi | ............... | A01G 5/04 239/6 |
| 2010/0095585 A1 * | 4/2010 | Hall | ............... | A47G 7/02 47/41.11 |
| 2016/0037729 A1 * | 2/2016 | Pandit | ............... | A01G 5/06 47/41.01 |
| 2016/0106043 A1 * | 4/2016 | Eiler | ............... | A01G 5/00 47/41.11 |
| 2016/0242579 A1 * | 8/2016 | Allan | ............... | A47G 7/02 |
| 2017/0055733 A1 * | 3/2017 | Gaffney | ............... | A47G 7/07 |
| 2018/0220590 A1 * | 8/2018 | Shaffer | ............... | A01G 5/04 |

FOREIGN PATENT DOCUMENTS

| | | | | |
|---|---|---|---|---|
| WO | WO-2008101058 A1 * | 8/2008 | ............... | A47G 7/07 |
| WO | WO-2016133432 A1 * | 8/2016 | ............... | A01G 5/04 |

* cited by examiner

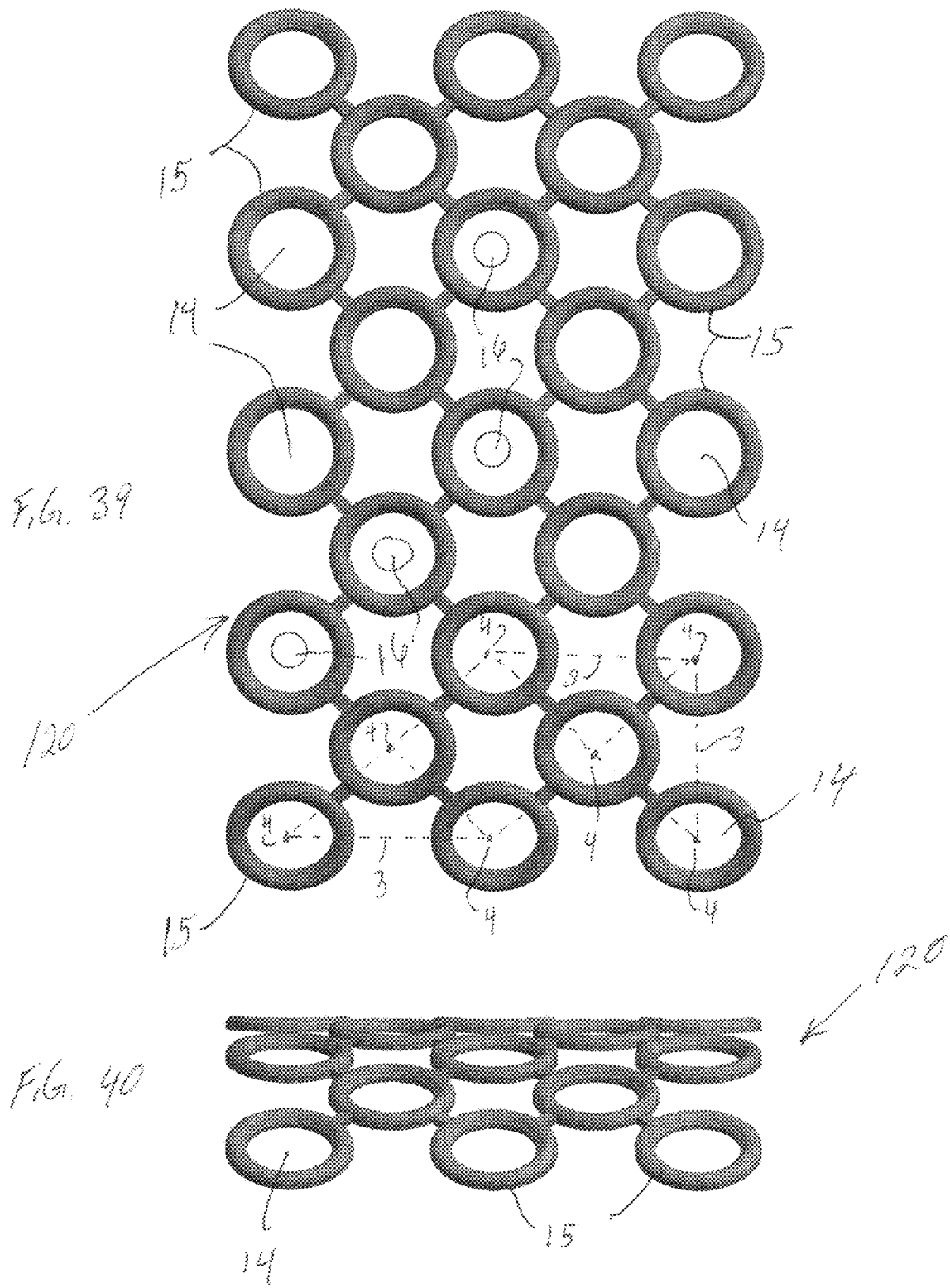

FLOWER STEM INSERTION DEVICE FOR FORMING FLOWER BOUQUETS

This Utility Patent Application is based on Provisional Patent Application No. 62/781,152 filed on Dec. 18, 2018.

BACKGROUND OF THE INVENTION

1. Field of the Invention

The present invention relates to a flower stem insertion device for forming predetermined flower bouquets. The invention includes a detachable outer portion having multiple apertures or target areas with a predetermined configuration for guiding the insertion of a flower stem into a deformable inner portion material disposed inside the outer portion. The invention further includes a base portion that encases a lower portion of the deformable inner portion material. The aperture distribution of the predetermined configuration of the outer portion corresponds to the predetermined flower bouquet arrangement. Replacing the outer portion with an alternative configuration enables a user to arrange a myriad of flower bouquets. The deformable inner portion material is held or otherwise "squeezed" between the outer portion and the base portion, resulting in the maintaining of the position of a flower stem when inserted into the deformable material with a flower attached to the flower stem, thereby enabling a user of the device to construct and maintain a flower bouquet configuration having flower stems inserted at varying surface positions upon and depths into the deformable material.

2. Background of the Prior Art

A myriad of prior art floral bouquet arranging devices are used to configure flowers and plants into a predetermined configuration. These prior art devices include conic section frames with apertures arranged for the insertion of flower and plant stems (US Patent Application Publication (US 2018/0220590); devices for twisting flower stems while maintaining the flower portions in a fixed position (US Patent Application Publication (US 2015/0059240); and flower grouping organizers designed to group flowers into a pre-selected patter for display in a vase (US Patent Application Publication (US 2003/0089033).

One problem with prior art floral bouquet arranging devices is that they do not provide an aperture framework that cooperates with a base portion to maintain the position of each flower stem inserted one at a time through the aperture framework and at varying depths into the base portion to achieve and maintain a predetermined flower bouquet configuration.

Another problem with prior art floral bouquet arranging devices is that they cannot maintain the insertion depth of flower stems unless all the flower stems converge substantially to a common point; whereupon, end portions of the flower stems are joined together, or the end portions engage a bottom portion of a vase.

Still another problem with prior art floral bouquet arranging devices is that the flower stems must be inserted through an aperture in an upper portion of the prior art device, then the end portion of the stem must be inserted into a lower portion of the prior art device.

Another problem with prior art floral bouquet arranging devices is that the flower stem receiving apertures are lineally aligned in rows and columns, resulting in bouquets having flowers in rows and columns thereby reducing the artistic appeal of the bouquet.

A need exists for a flower stem insertion device for forming a flower bouquet that includes an outer portion having multiple apertures for receiving flower stems, the outer portion being detachable secured to a base portion that encases a portion of a deformable material. The position of the deformable material being maintained relative to the outer portion and base portion, thereby maintaining the position of the flower stem relative to the surface of the deformable material and maintaining the insertion depth of the flower stem into the deformable material. The cooperation between the outer portion, deformable material and base portion enables the user to form a predetermined flower bouquet having a constant hemispheric periphery, or consisting of adjacent flowers being longitudinally offset by varying the insertion depth of each flower stem inserted through a corresponding aperture in the outer portion.

Further, a need exists for a flower stem insertion device for forming a flower bouquet that enables a user to vary the number of flowers forming the bouquet by selecting one of many outer portions having relatively large or relatively small quantities of apertures. The selected outer portion is detachably secured to or separated from the base portion with relatively little manual force imparted by the user.

Yet another need for a flower stem insertion device for forming a flower bouquet is to include stem retaining members that prevent a flower stem from being extracted from the deformable inner portion material. Alternatively, the stem retaining members can include elements that secure the position of the flower stem in the deformable inner portion material, but allow the flower stem to be extracted via sufficient manual force without damage to the flower stem.

Still another need for a flower stem insertion device for forming a flower bouquet is to offset rows and columns of stem receiving apertures to provide a "zigzag" flower bouquet arrangement, resulting in a more artistic and "sellable" flower bouquet required by both merchants and purchasers.

SUMMARY OF THE INVENTION

It is an object of the present invention to provide a flower stem insertion device for forming flower bouquets. A principal object of the present invention is to provide a flower stem insertion device that enables a user of the device to form a myriad of flower bouquets designs by selecting a corresponding element of the device that detachably secures to a cooperating element of the device. A feature of the flower stem insertion device is an outer portion having a plurality of apertures acting as target areas for receiving flower stems; the outer portion being selected from a myriad of outer portions such that the selected outer portion corresponds to a preselected configuration for the flower bouquet to be formed by the device. An advantage of the device is that the selected outer portion can be replaced with a relatively small amount of manual force by an alternative outer portion having a different array of apertures.

Another object of the present invention is to provide a flower stem insertion device that allows flower stem end portions to penetrate an element of the device a depth that enables a user of the invention to position flowers to ultimately form a preselected flower bouquet. A feature of the device is a deformable inner portion material that removably receives end portions of flower stems inserted through the apertures of the outer portion. An advantage of the device is that the deformable inner portion material allows each flower stem to be individually inserted through a selected aperture to a preferred depth in the deformable inner portion material independent of adjacent flower stems, thereby allowing the user to position each flower attached to the inserted flower stem independent of adjacent flowers, resulting in a flower bouquet configuration that can be changed by further inserting or extracting a respective flower stem from the deformable inner portion material.

Still another object of the present invention is to provide a flower stem insertion device that allows any one of a myriad of outer portions to be manually secured to or separated from an element of the device that encases a section of the deformable inner portion material. A feature of the device is a base portion that snugly encases the deformable inner portion material when a selected outer portion is detachably secured to the base portion. An advantage of the device is that the flower stems are snugly secured within the deformable inner portion material and the relative position of each flower attached to a respective flower stem is also maintained, thereby allowing a user of the device to form a predetermined flower bouquet.

Yet another object of the present invention is to provide a flower stem insertion device that includes a plurality of flower stem receiving members disposed to ultimately configure a preselected flower bouquet when stem portions of preselected flowers are inserted through outer portion apertures smaller than the diameter of the flower stem inserted through the aperture. A feature of flower stem receiving members is a plurality of locking members for securing the position of flower stem portions relative to an outer portion. An advantage of the device is that the locking members are configured and sized to provide a stem aperture smaller in cross sectional area that the cross sectional area of a flower stem inserted through the stem aperture. Another advantage of the device is that each locking member includes a relatively "rounded" inward directed portion that forcibly engages a corresponding flower stem portion to restrict the flower stem from being extracted from the deformable inner portion material.

Another object of the present invention is to provide a flower stem insertion device that includes a plurality of flower stem receiving members disposed to ultimately configure a preselected flower bouquet when stem portions of preselected flowers are inserted through outer portion apertures smaller than the diameter of the flower stem inserted through the aperture, but with the smaller apertures including locking members that allow a flower stem to be removed from the outer portion when sufficient manual force is applied to extract the flower stem. A feature of flower stem receiving members is a plurality of locking members having stem engagement portions having a triangular configuration that includes a relatively blunt, inwardly curved tip portion that arcuately curves such that an edge portion of the tip portion does not engage the flower stem portions thereby avoiding impediments to the extraction of the flower stems from the outer portion. An advantage of the device is that a flower stem can be removed from the outer portion without damage when a relatively small manual extraction force is applied to the flower stem.

Another object of the present invention is to provide a flower stem insertion device that includes non-linear flower arrangements for flower stem receiving members disposed upon the surface of an outer portion of the device. A feature of the device is a plurality of flower stem receiving members grouped together to form an "arcuate triangle" on the surface of a hemisphere configured outer portion of the device, or flower stem receiving members grouped together to form a relatively planar triangle on the surface of a relatively planar outer portion of the device. An advantage of the device is that the triangle configurations of the grouped flower stem receiving members provide non-linear or zigzag flower configurations when flower stem portions are inserted through cooperating receiving members, resulting in a flower bouquet having a more artistic and visually pleasing design.

BRIEF DESCRIPTION OF THE DRAWINGS

Objects, advantages and novel features of the present invention, as well as details of an illustrative embodiment thereof, will be understood from the following detailed description and attached drawings, wherein:

FIG. 39 is a top elevation view of the outer portion of FIG. 38.

FIG. 40 is an end elevation view of the outer portion of FIG. 39.

DESCRIPTION OF THE PREFERRED EMBODIMENT

Figure 1:
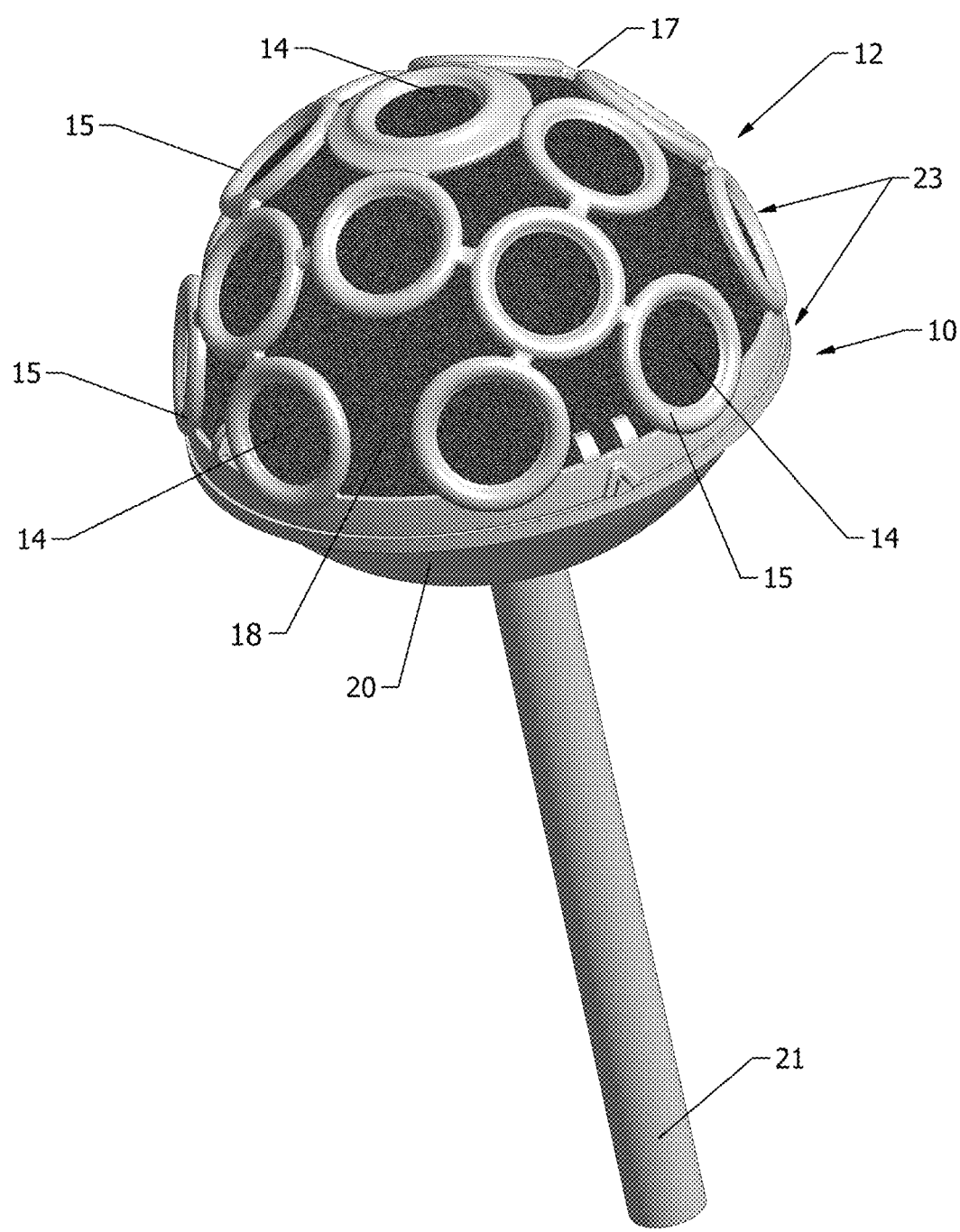
FIG. 1 is a perspective view of a flower stem insertion device for forming flower bouquets in accordance with the present invention.
Figure 1A:
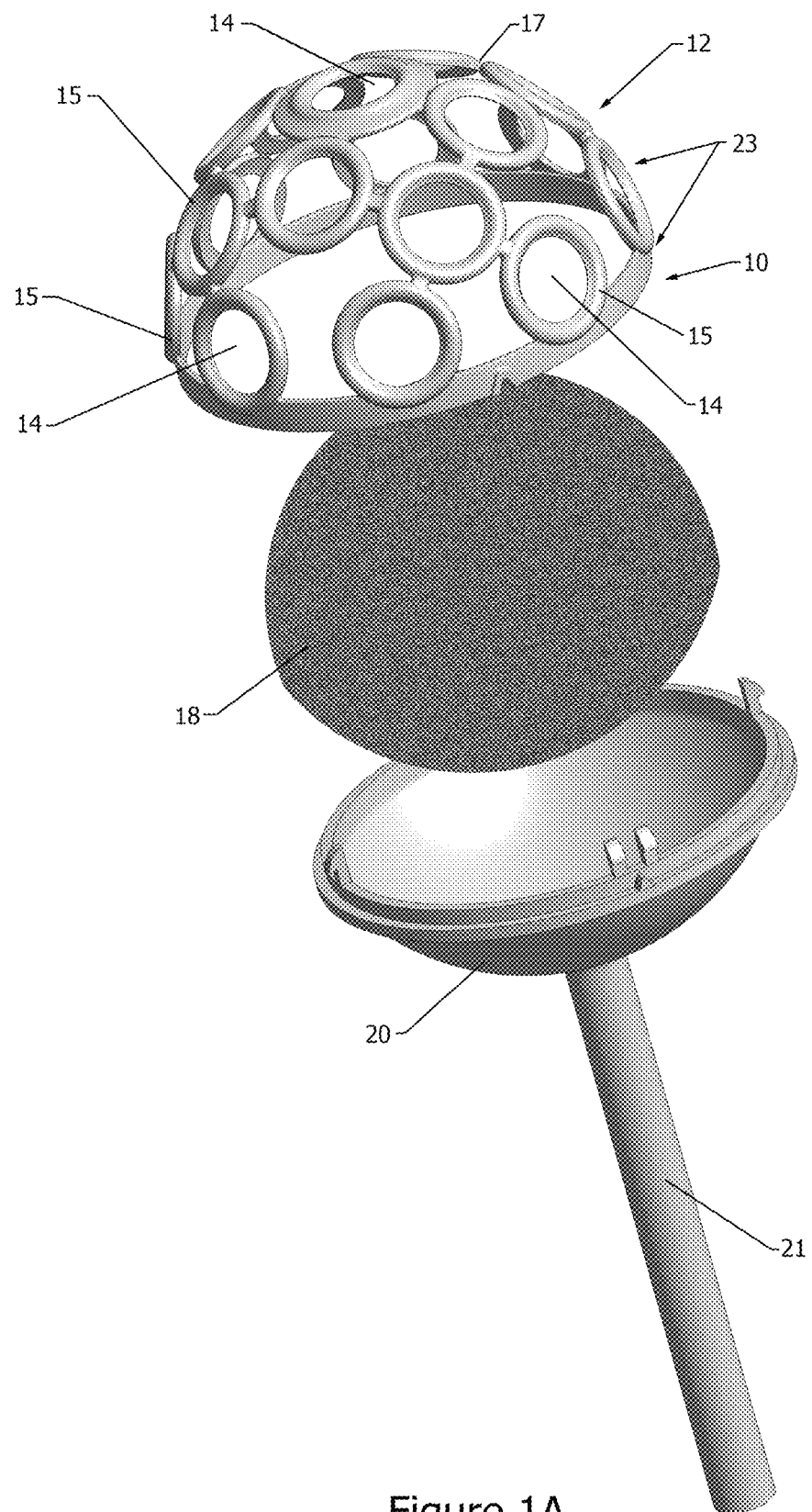
FIG. 1A is an exploded view of FIG. 1.
Figure 1B:
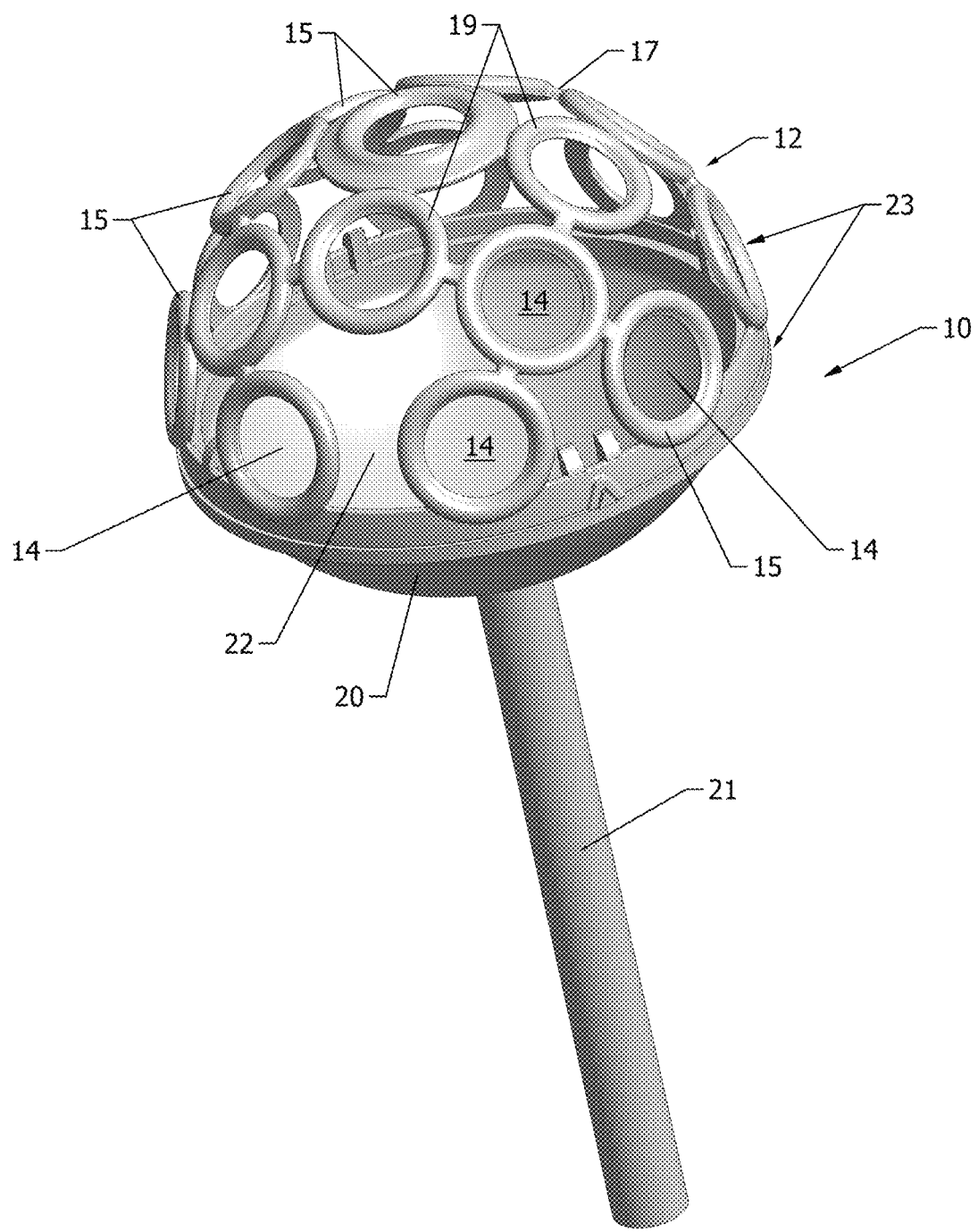
FIG. 1B is the perspective view of FIG. 1, but with a deformable inner portion removed.
Figure 2:
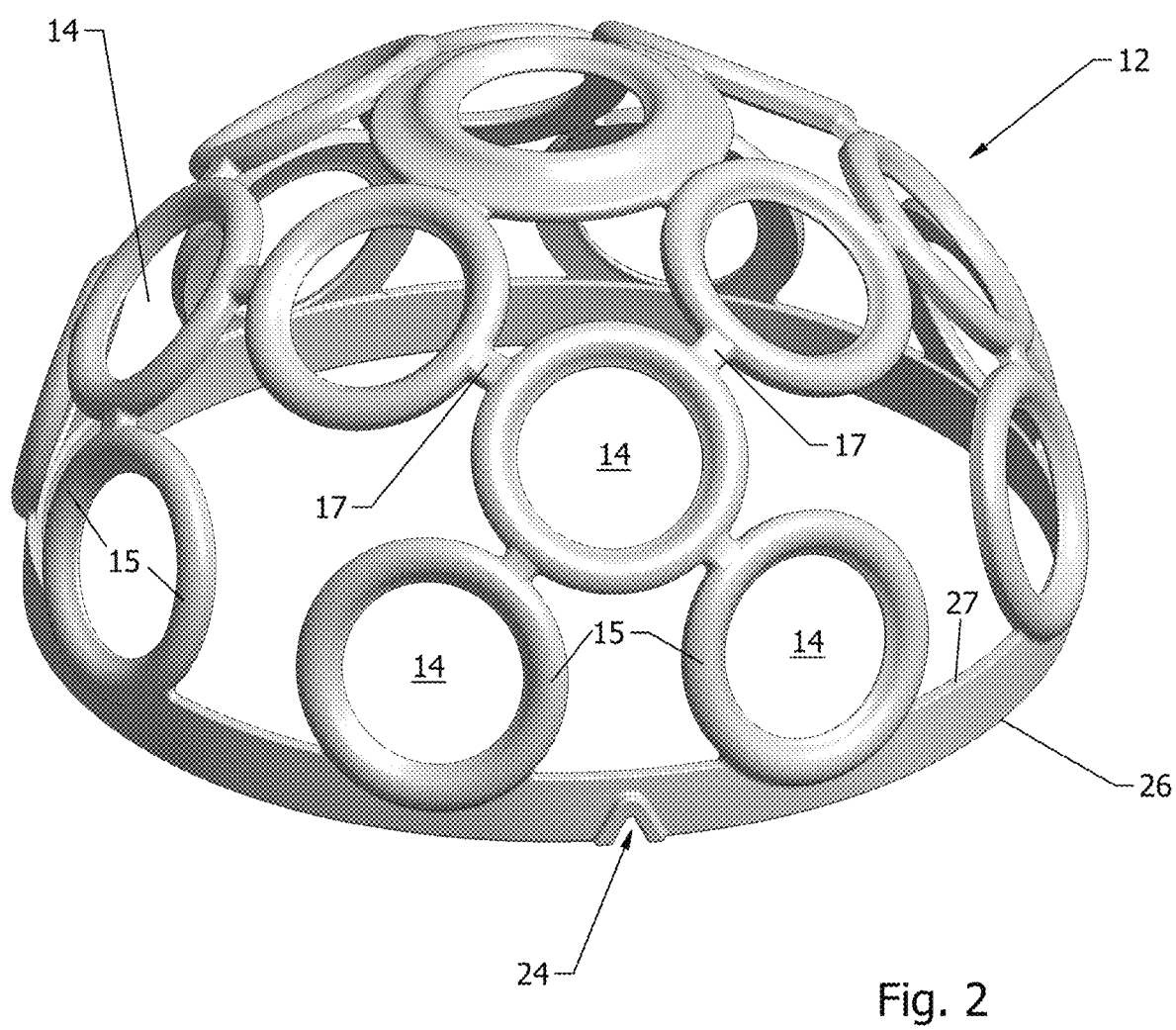
FIG. 2 is a perspective view of an outer portion of the device of FIG. 1 in accordance with the present invention.
Figure 2A:
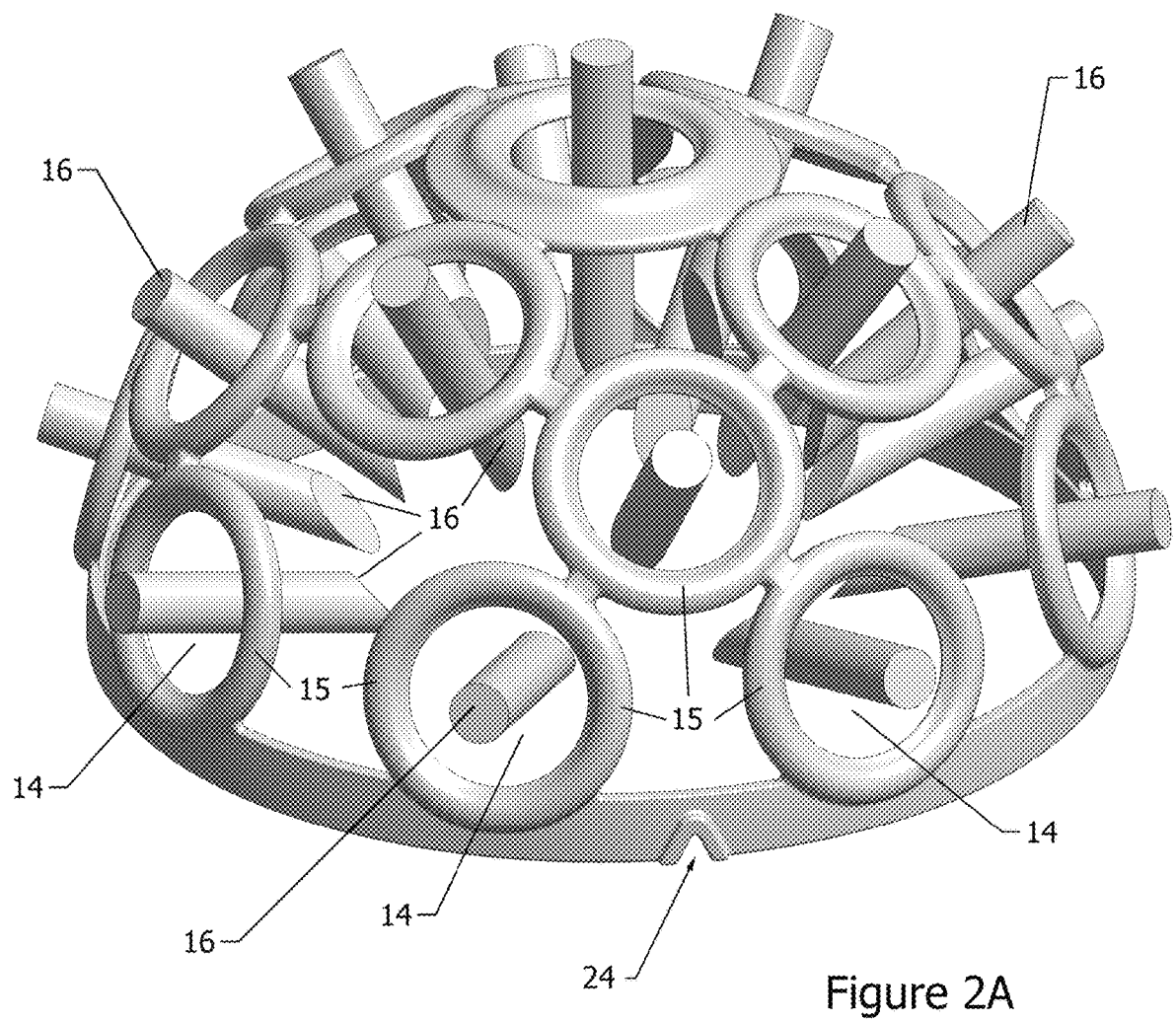
FIG. 2A is the perspective view of FIG. 2 but with flower stem portions inserted in apertures.
Figure 4:
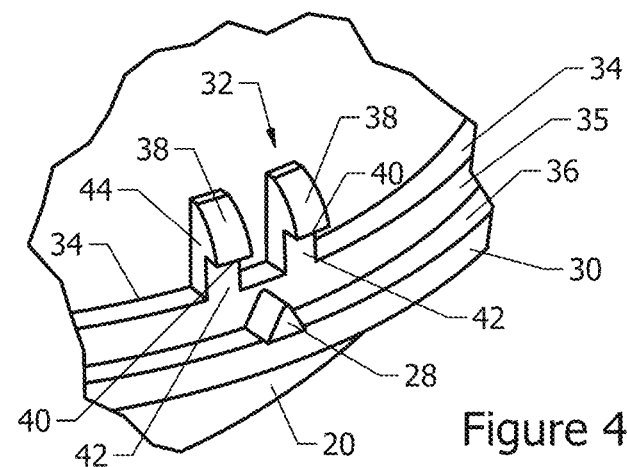
FIG. 4 is a perspective detail view of a portion of the base portion of FIG. 3.
Figure 3:
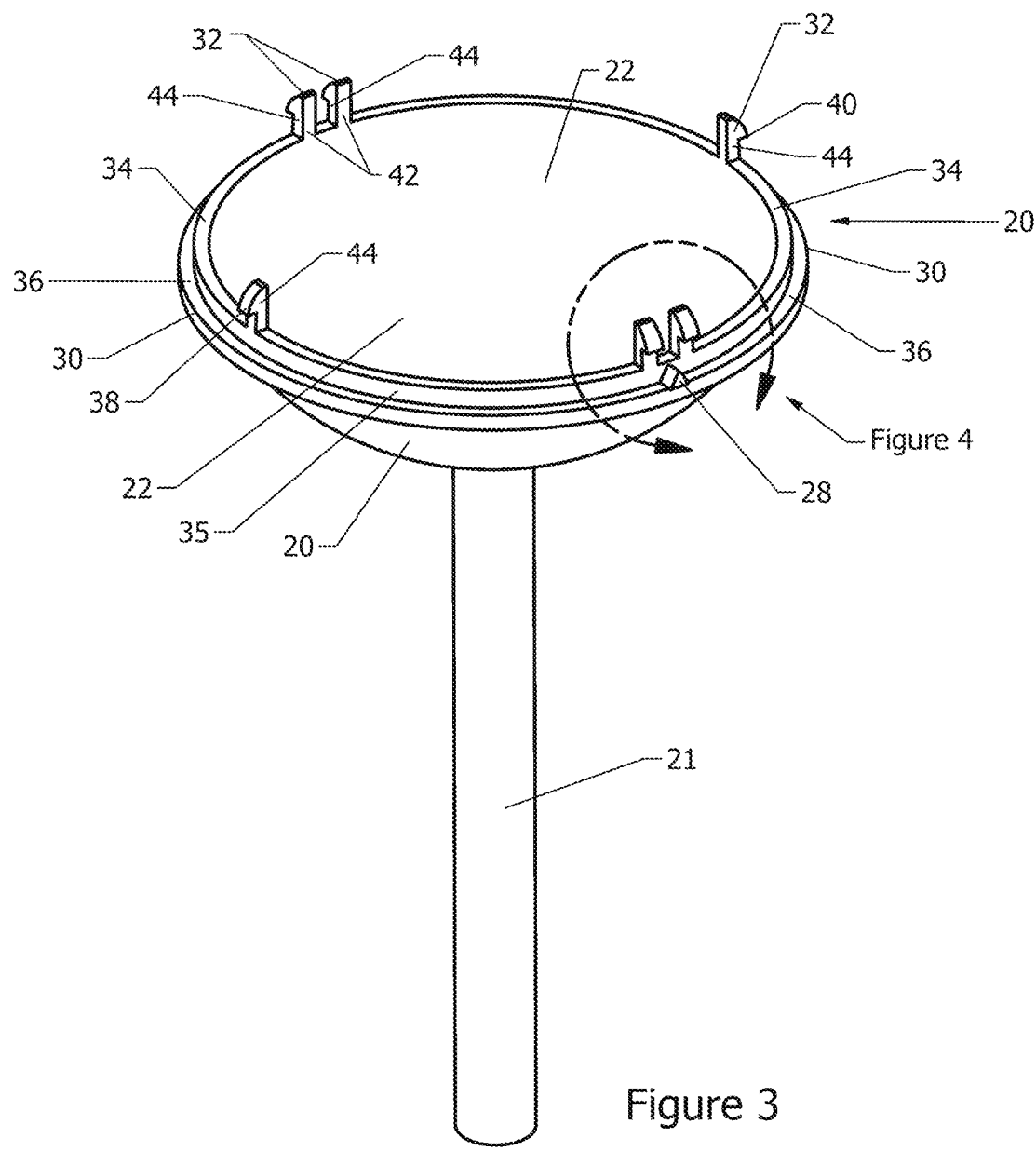
FIG. 3 is a perspective view of a base portion of the device of FIG. 1.
Figure 5:
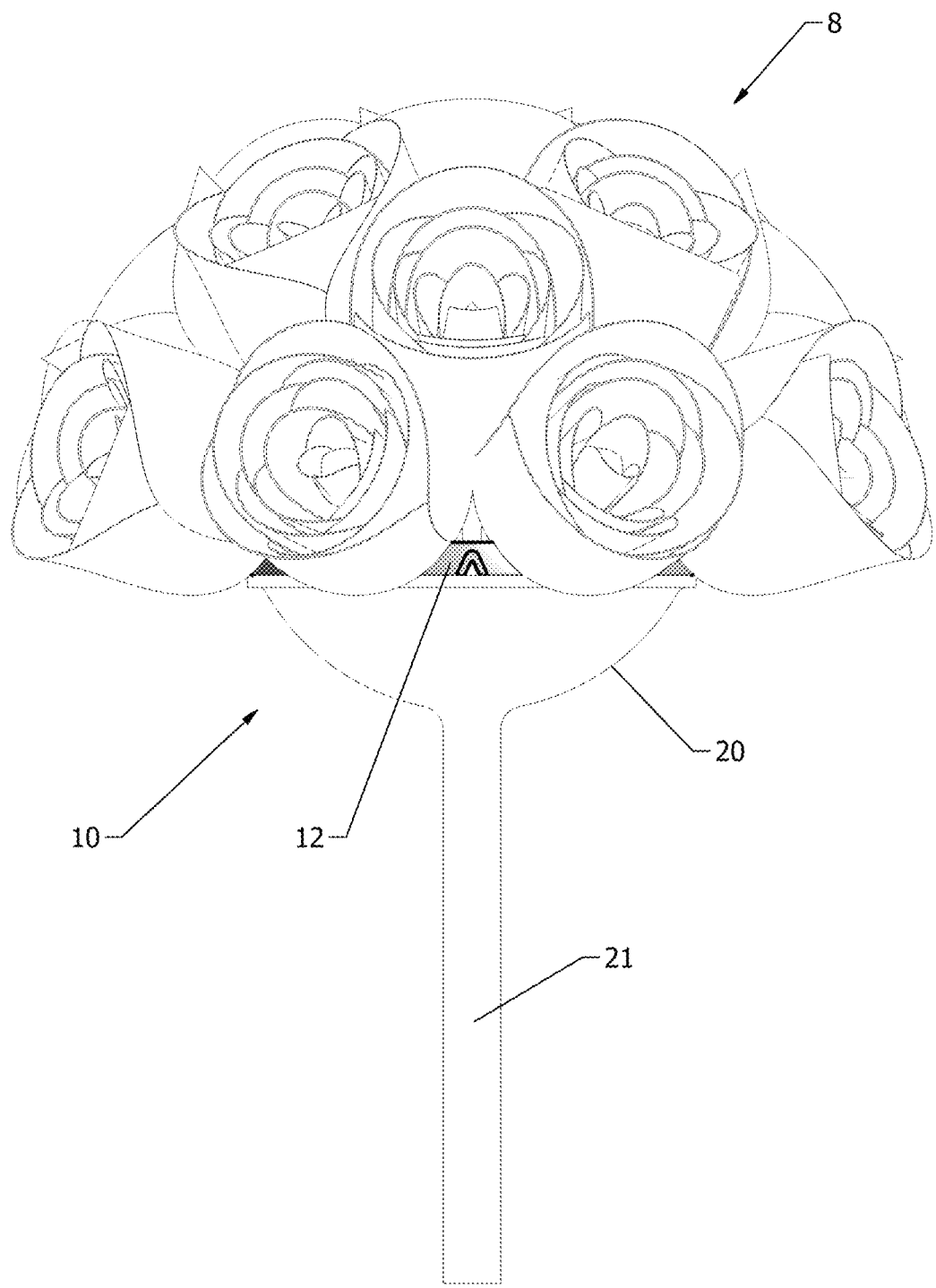
FIG. 5 is a front elevation view of the device of FIG. 1 with a flower bouquet.
Figure 6:
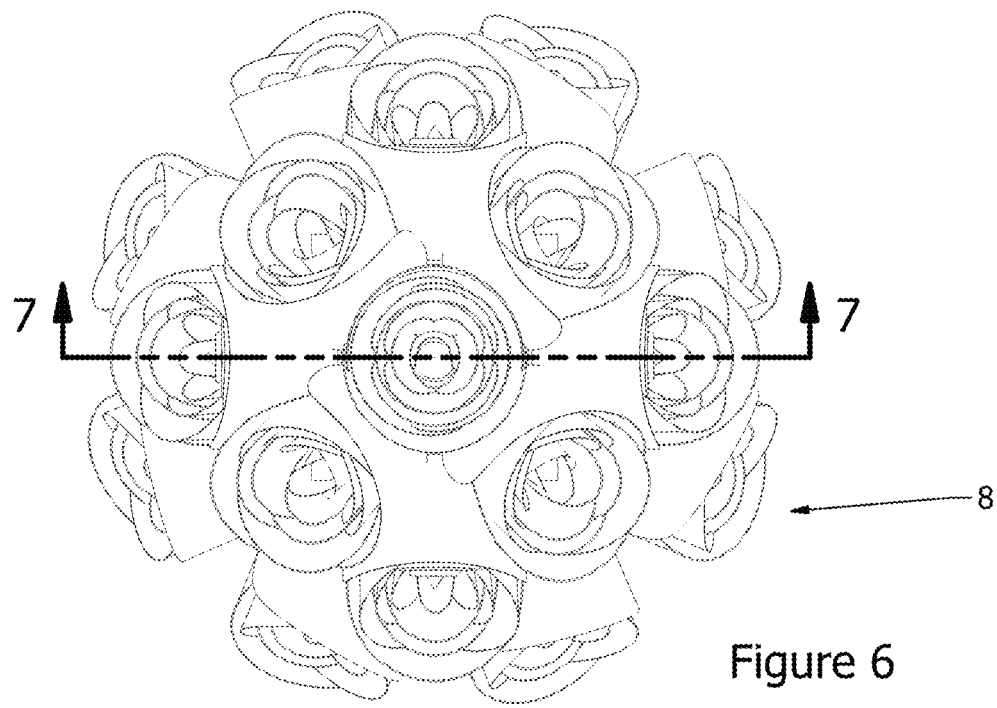
FIG. 6 is a top elevation view of the flower bouquet of FIG. 5.
Figure 7:
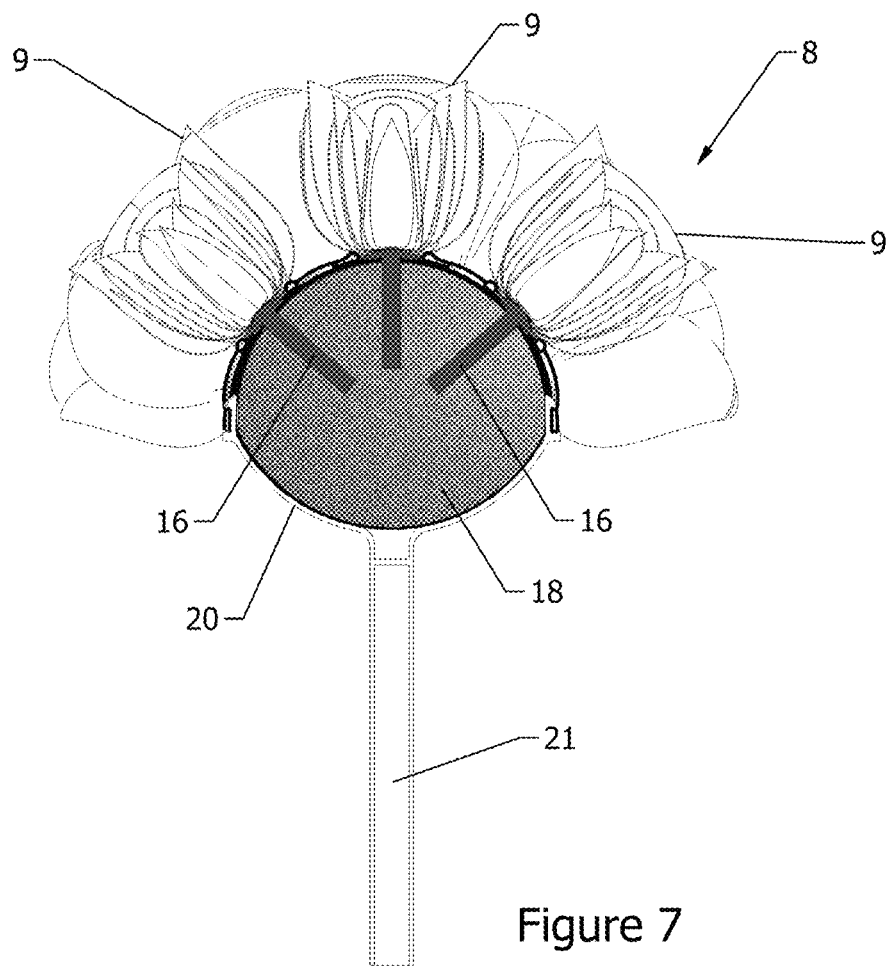
FIG. 7 is a section view taken along line 7-7 of FIG. 6.
Figures 8, 9:
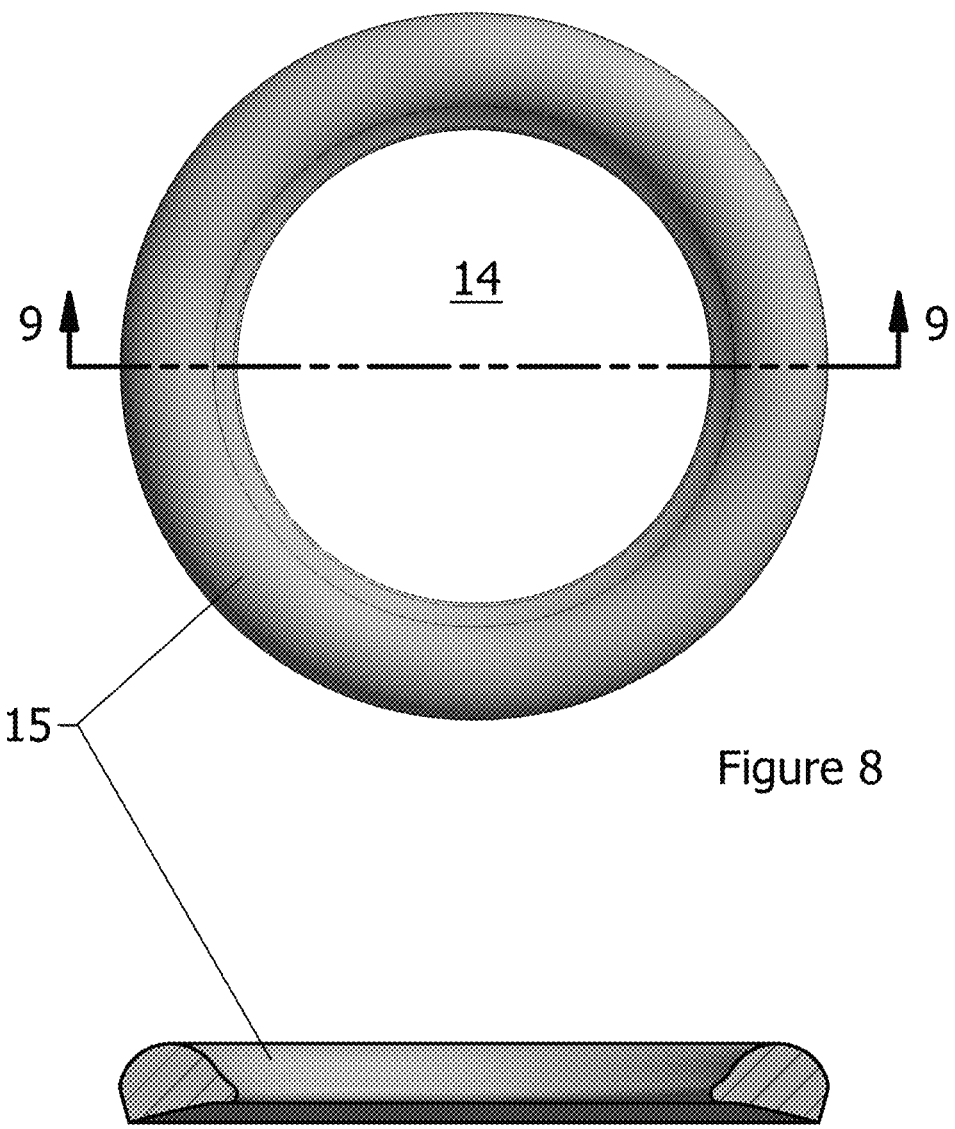
FIG. 8 is a top elevation view of a stem receiving member.
FIG. 9 is a sectional view taken along line 9-9 of FIG. 8.
Figure 10:
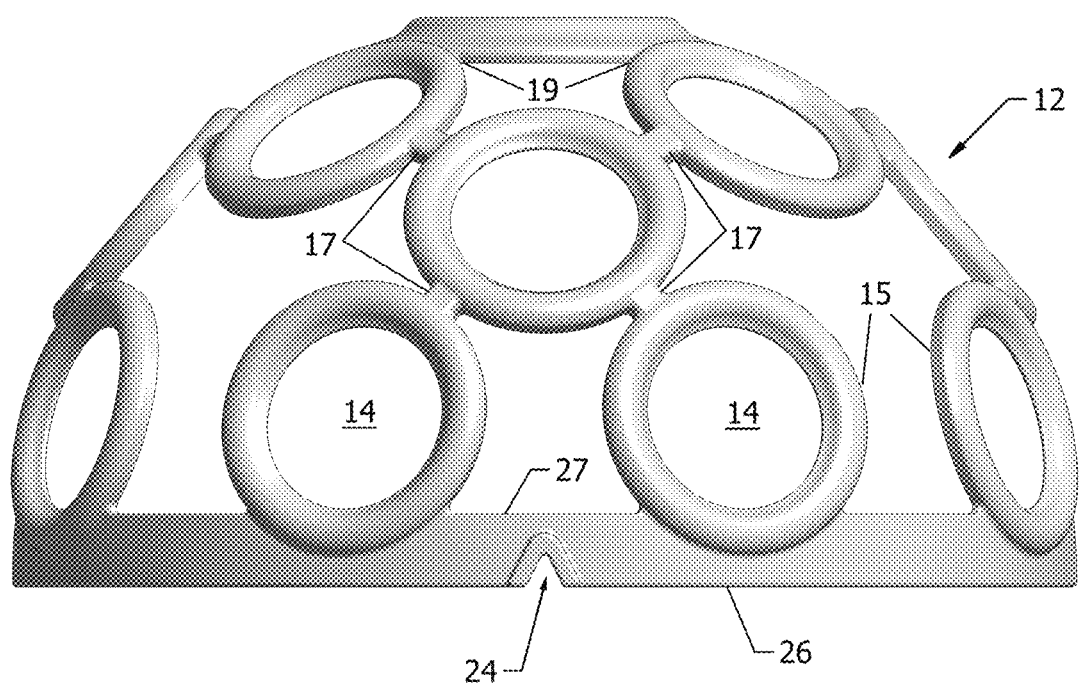
FIG. 10 is a front elevation view of the outer portion depicted in FIG. 1.

Referring to FIGS. 1-12, a flower stem insertion device for forming flower bouquets in accordance with the present invention is denoted as numeral 10 and includes an outer portion 12 fabricated from a relatively flexible polymer material and having a plurality of apertures 14 disposed to ultimately configure a preselected flower bouquet 8 when stem portions 16 of preselected flowers 9 are inserted through the apertures 14. The flower stem insertion device 10 further includes a deformable inner portion 18 fabricated from floral foam or similar material capable of retaining water to accommodate natural flowers. Alternatively, the deformable inner portion 18 can be fabricated from a dry foam such as Styrofoam to receive artificial flowers. The deformable inner portion 18 is configured to cooperate with the outer portion 12 such that when the stem portions 16 of the preselected flowers are ultimately inserted through the apertures 14, the stem portions 16 penetrate the deformable inner portion 18 a predetermined distance sufficient to maintain the position of each preselected flower relative to the outer portion 12.

The flower stem insertion device 10 also includes a base portion 20, which includes a detachable handle 21 (when required to enable the device 10 to be hand held), the base portion 20 being fabricated from a relatively flexible polymer material and having a recess 22 configured and dimensioned to snugly receive the deformable inner portion 18. The base portion 20 is detachably secured to the outer portion 12, thereby forming an enclosure 23 for removably receiving the deformable inner portion 18, whereby, the stem portions 16 penetrate the deformable inner portion 18 a predetermined distance sufficient to maintain the position of each preselected flower relative to the outer portion 12 to ultimately configure a preselected flower bouquet that completely covers the outer and deformable inner portions 12 and 18.

As an alternative to the flower stem insertion device 10 being constructed from a flower stem receiving portion or an outer portion 12 with apertures, a base portion 20 and a deformable inner portion 18, the device 10 can be constructed from only the outer portion 12 and the base portion 20 without including the deformable inner portion 18. Constructing a flower stem insertion device 10 without the deformable material 18 enables a user of the device 10 to insert flower stem portions 16 into and remove the stem portions 16 from the outer portion 12 relatively easily, thereby allowing a user of the device to quickly reconfigure or replace flowers inserted into the apertures 14 to achieve an acceptable flower bouquet that completely covers the outer portion 12, when flower stem portions 16 have been inserted through the apertures 14 in the outer portion 12 a predetermined distance sufficient to maintain the position of each preselected flower relative to said outer portion 12.

The outer portion 12 of the device 10 includes a substantially hemisphere configuration having a preselected quantity of the apertures 14 disposed to receive a corresponding quantity of flower stems inserted through the apertures 14 and into the deformable inner portion 18 a predetermined distance, such that engagement between adjacent flower stem portions 16 is prevented and the insertion depth of each flower stem portion 16 into the deformable inner portion 18 is sufficient to maintain the position of each flower stem portion 16 relative to the inner portion 18. The apertures 14 can include a myriad of configurations including annular, square, triangular, hexagon and variations thereof. Further, an aperture having a triangular configuration can be orientated with a downward directed point or "V" portion such that a flower stem can be inserted into an upper portion of the aperture, then manually urged a relatively small distance in a downward direction until a portion of the flower stem engages both walls forming the "V" portion.

The outer portion 12 further includes an inverted "V" or similarly configured recess 24 in a bottom edge portion 26 that snugly engages a cooperating inverted "V" configured protrusion member 28 integrally joined to a top wall 36 of an outer edge portion 30 of the base portion 20, thereby preventing rotation of the outer portion 12 upon the top wall 36 of the outer edge portion 30 of the base portion 20. The base portion 20 includes clamp members 32 integrally joined to a top wall 34 of an inner edge portion 35 of the base portion 20. The clamp members 32 are configured and dimensioned to secure the bottom edge portion 26 of the outer portion 12 upon the top wall 36 of the outer edge portion 30 of the base portion 20.

The clamp members 32 include an inclined top wall 38, which is ultimately engaged by the bottom edge portion 26 of the outer portion 12, and a bottom wall 40 formed by a base portion 42 having side walls 44 with lateral dimensions equal to the "thickness" of the top wall 34 of the edge portion 30. The clamp members 32 capture a top edge portion 27 of the outer portion 12 after the bottom edge portion 26 is forcibly slid upon the inclined top walls 38 until the outer portion engages the base portions 42 and bottom walls 40 of the clamp members 32, and the top wall 36 of the outer edge portion 30 of the base portion 20. The flexible polymer material used to fabricate the device 10 allows a user of the device 10 to urge one or more of the clamp members 32 toward the center of the recess 22 of the base portion 20 to allow the outer portion 12 to be separated from the base portion 20 to replace the deformable inner portion 18 when required by the user.

Figure 11:
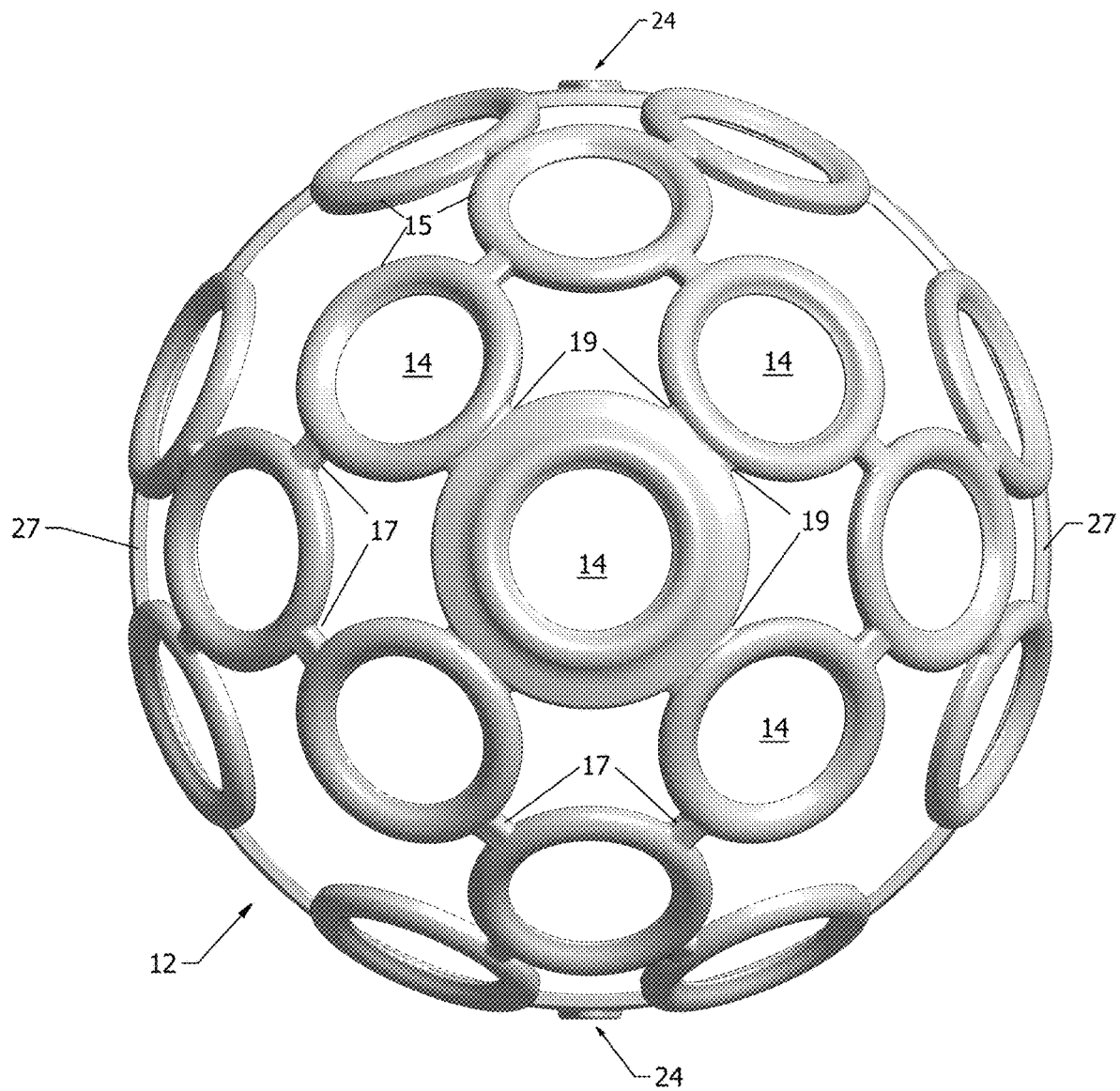
FIG. 11 is a top elevation view of the outer portion depicted in FIG. 1.
Figure 11A:
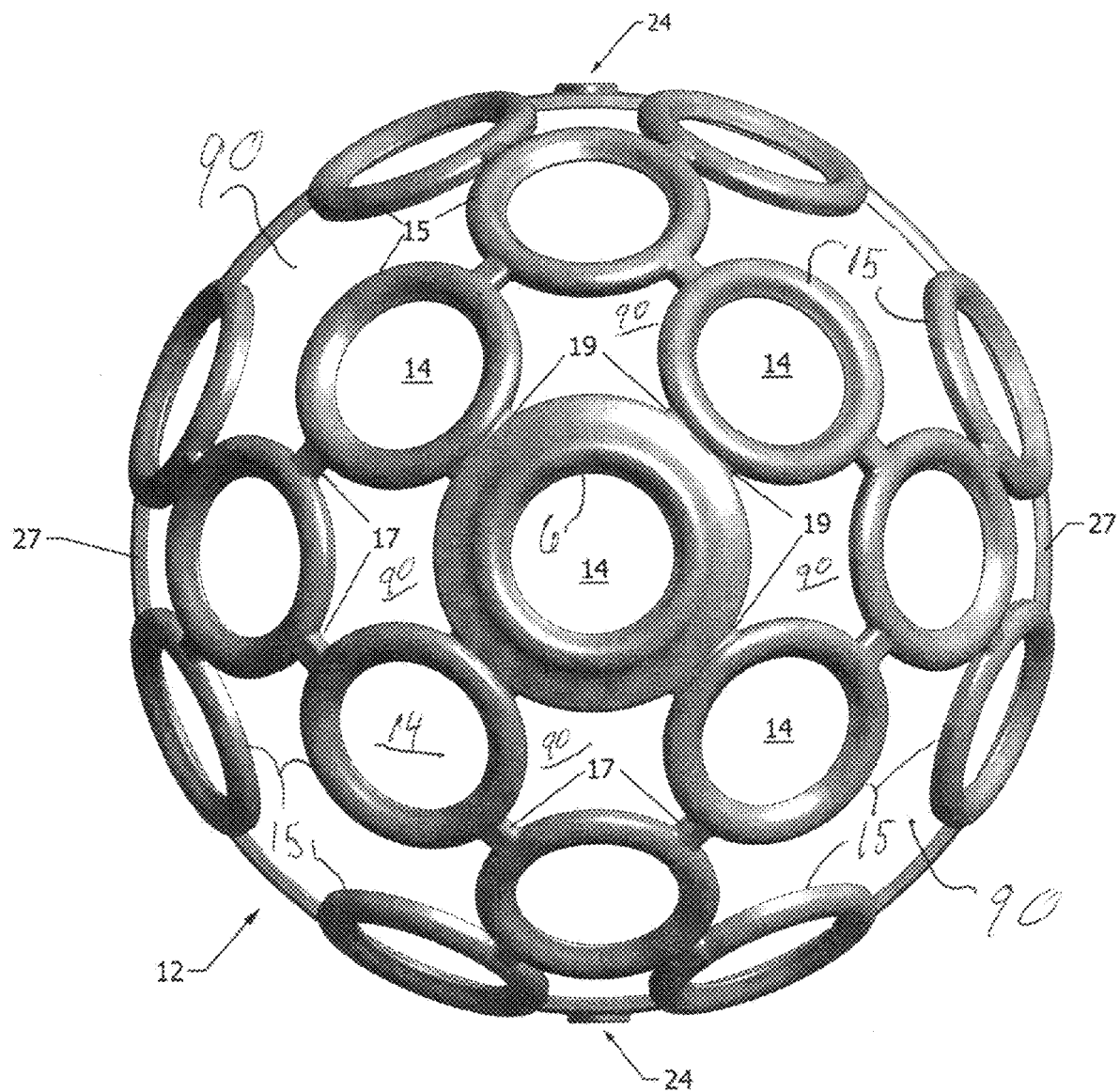
FIG. 11A is the top elevation view of FIG. 11, but with the number "6" added to identify a top stem receiving member.
Figure 12:
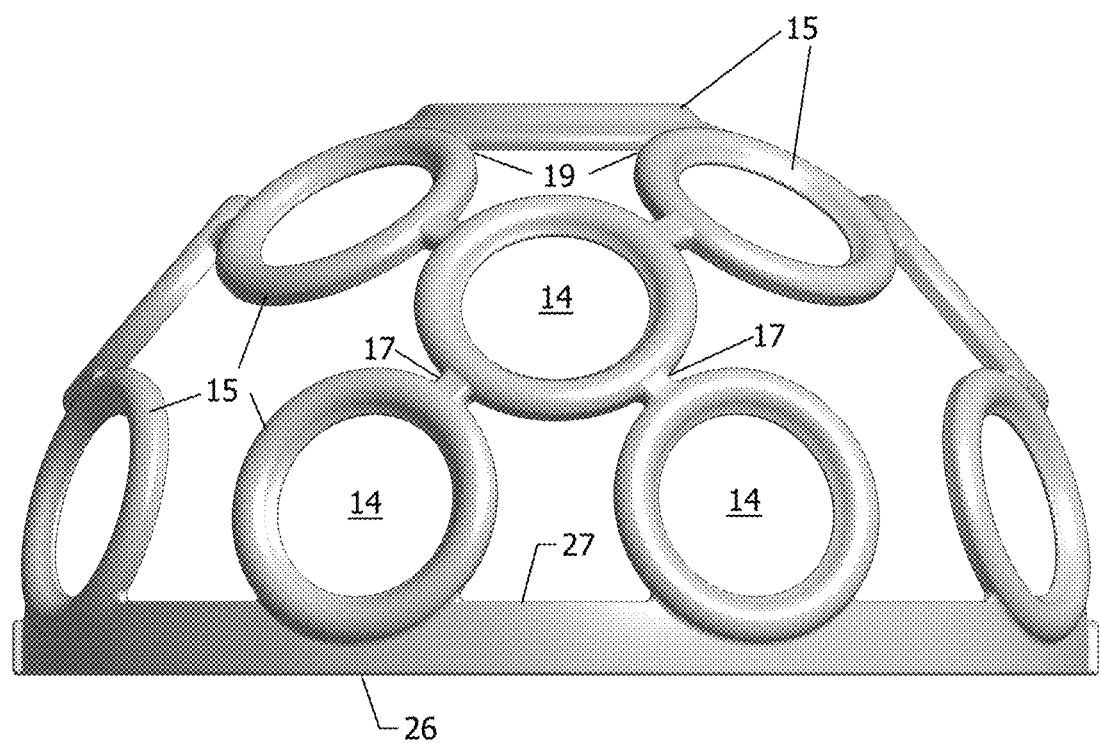
FIG. 12 is a side elevation view of the outer portion depicted in FIG. 1.
Figure 13:
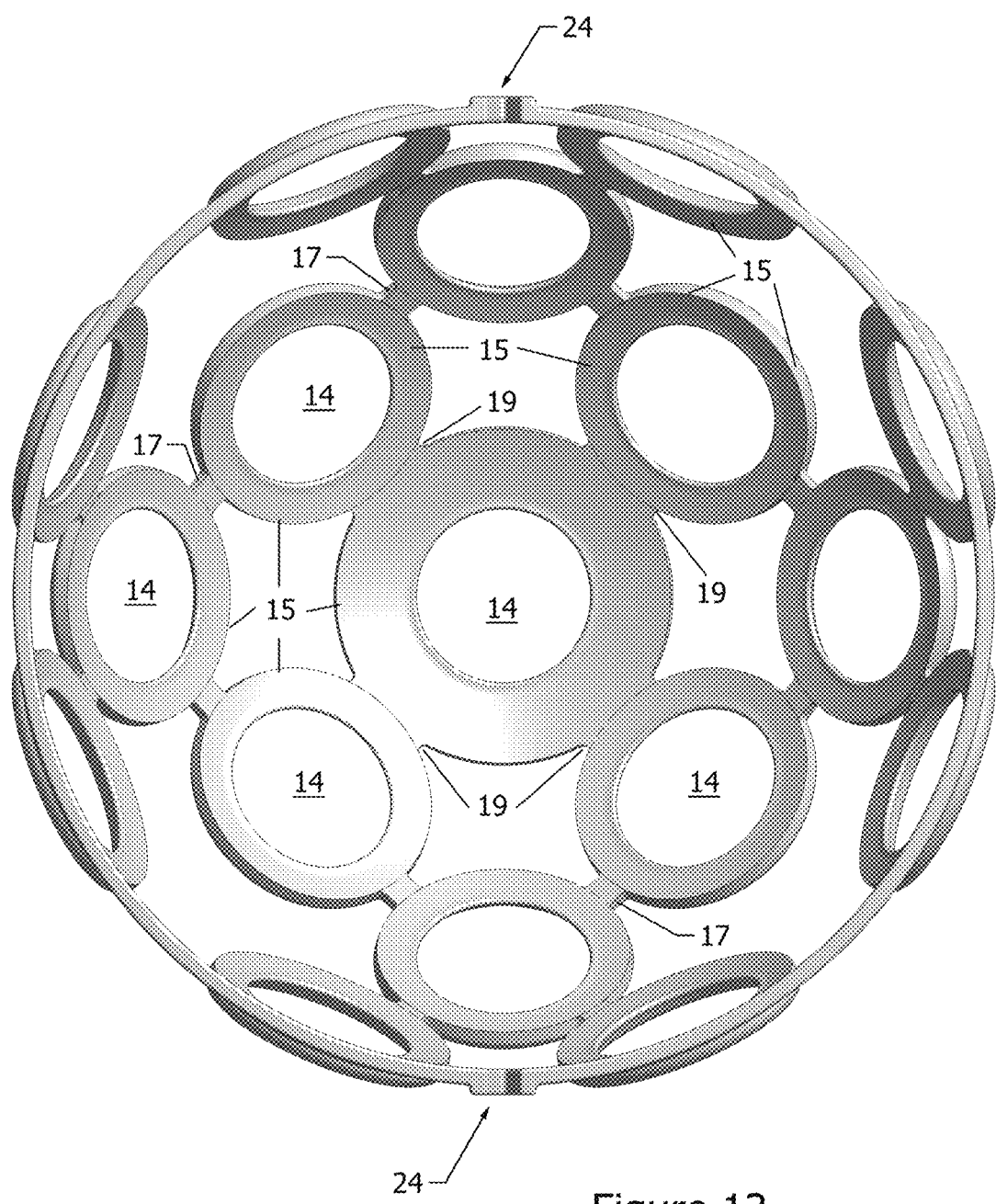
FIG. 13 is a bottom elevation view of the outer portion depicted in FIG. 1.
Figure 14:
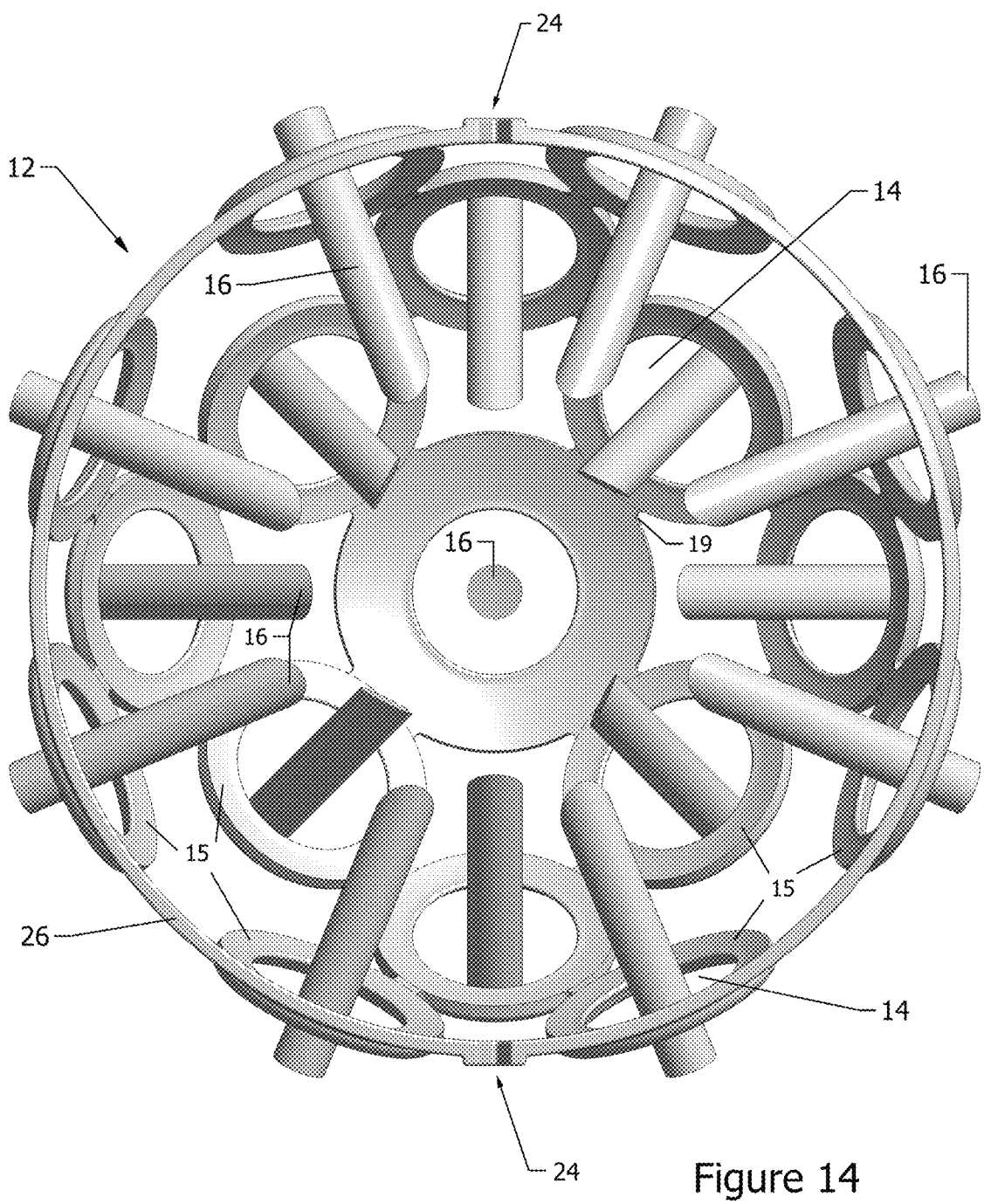
FIG. 14 is the bottom elevation view of FIG. 13 but with flower stem portion inserted in apertures.
Figure 15:
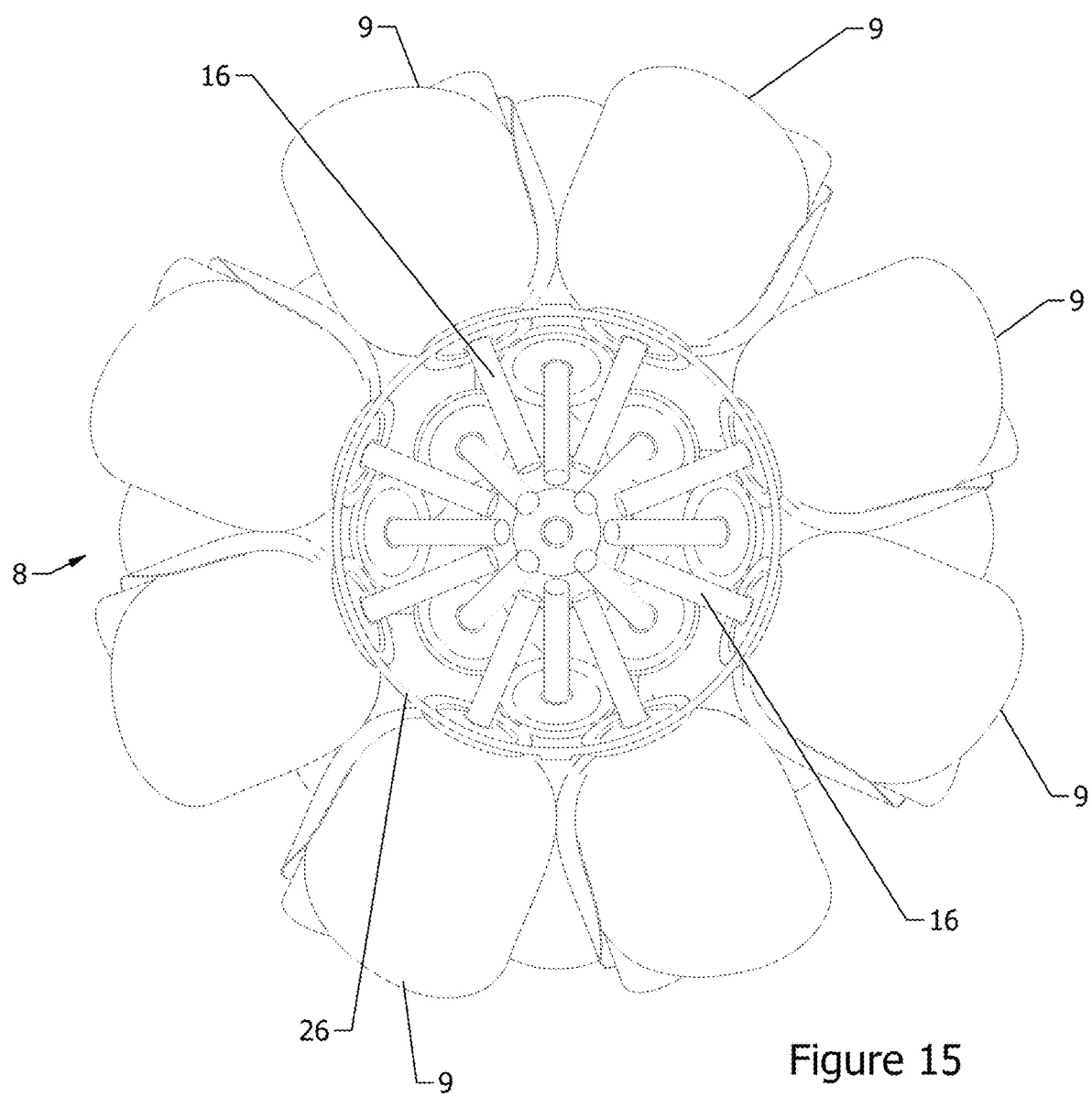
FIG. 15 is bottom elevation view of the outer portion of FIG. 13 but with flowers and flower stems depicted.
Figure 16:
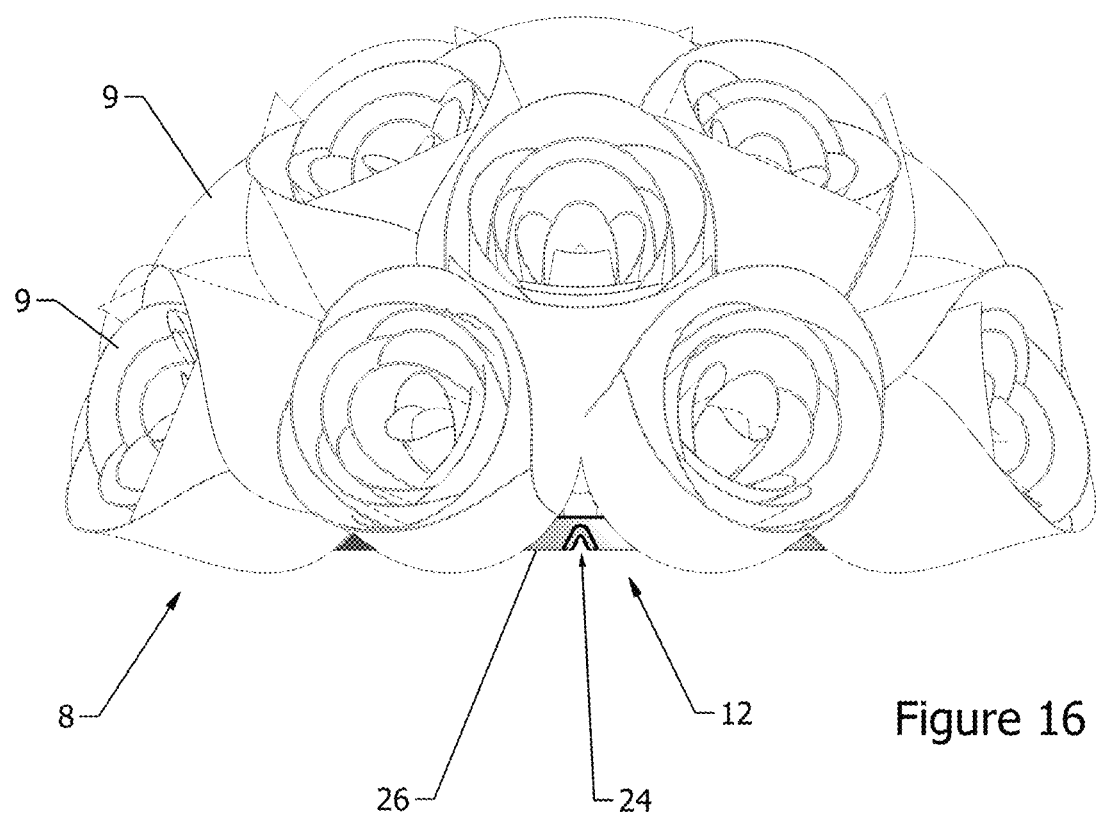
FIG. 16 is a front elevation view of FIG. 15.
Figure 17:
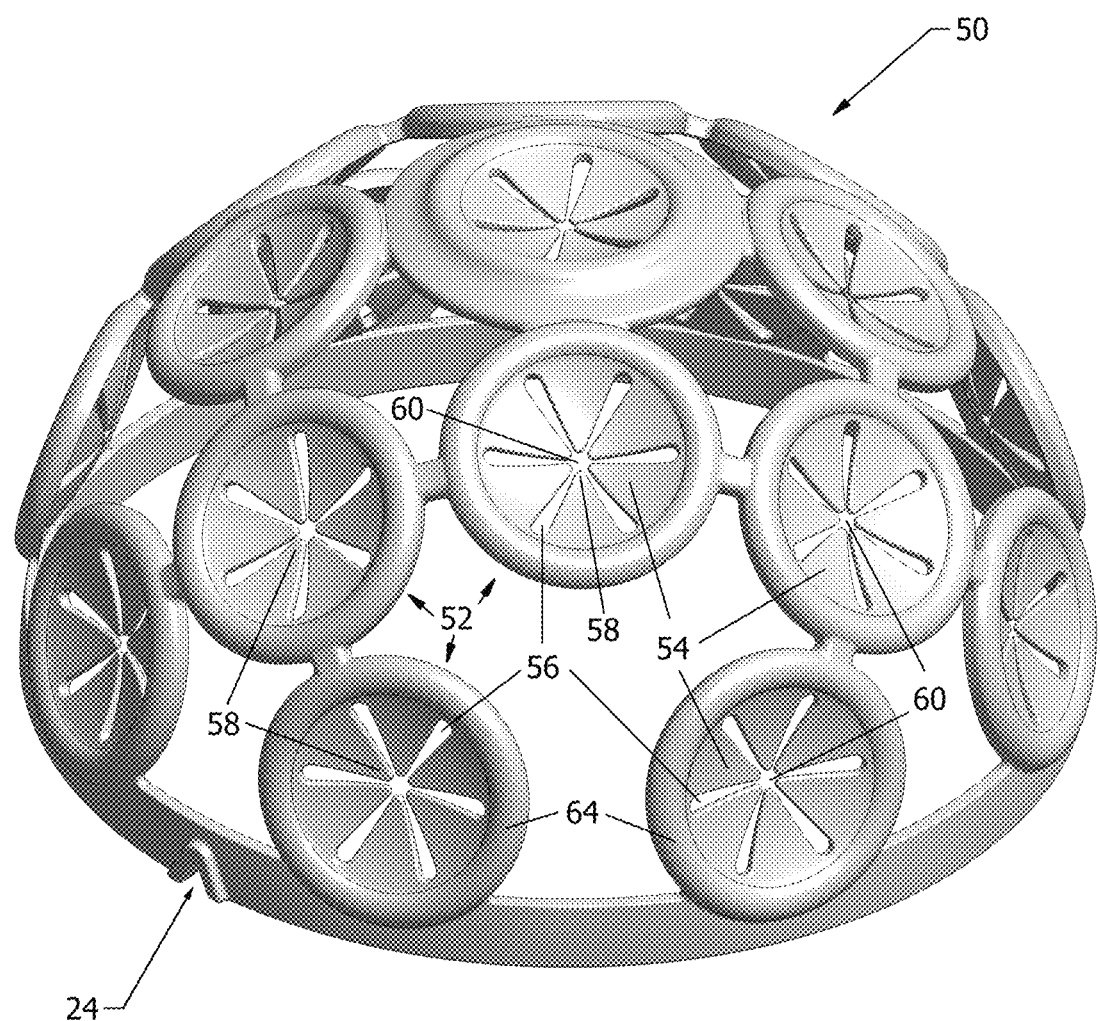
FIG. 17 is a perspective view of an alternative outer portion for the device of FIG. 1 in accordance with the present invention.
Figure 18:
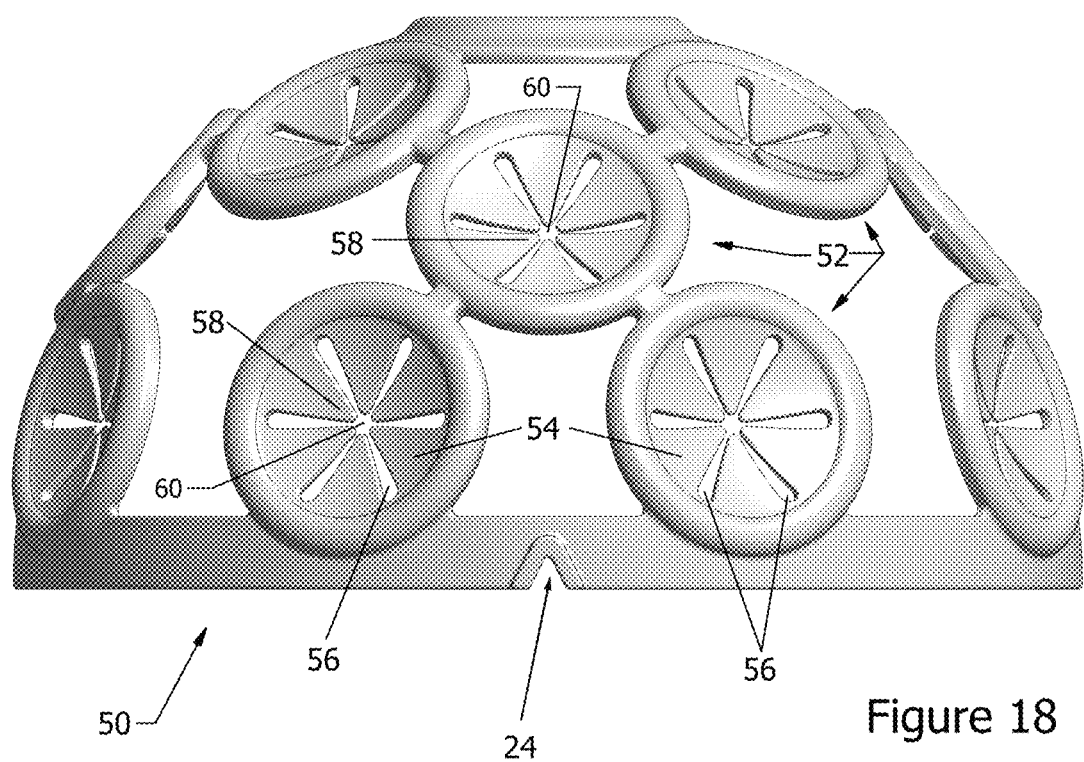
FIG. 18 is a front elevation view of the alternative outer portion of FIG. 17.
Figure 19:
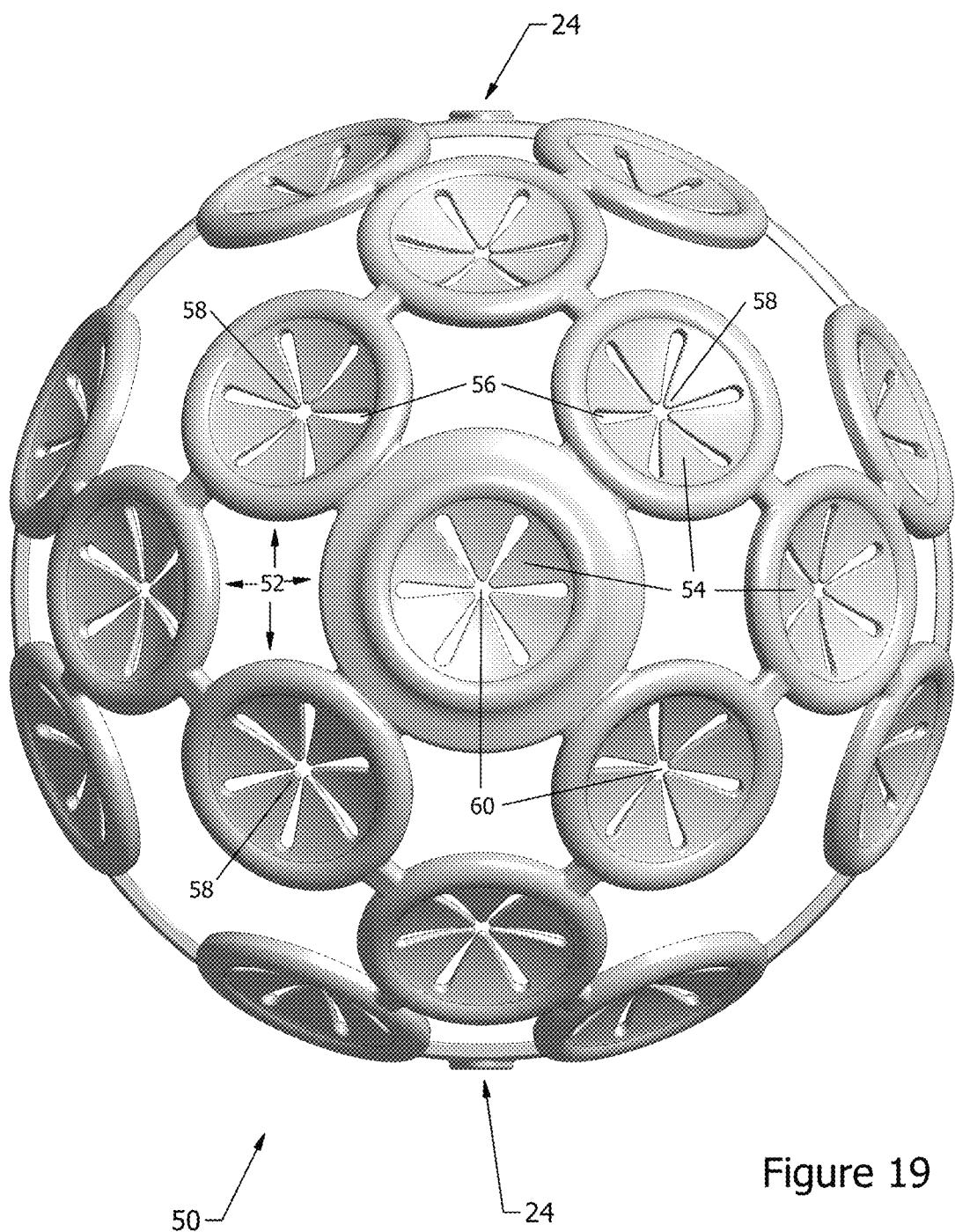
FIG. 19 is a top elevation view of the alternative outer portion of FIG. 17.
Figure 20:
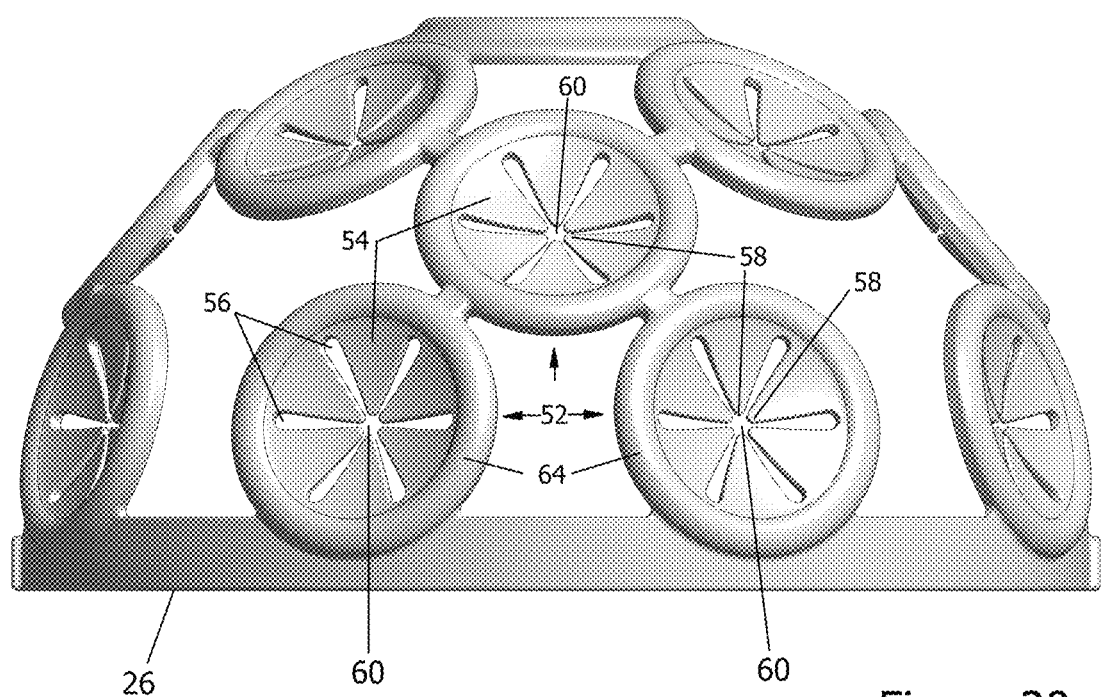
FIG. 20 is a side elevation view of the alternative outer portion of FIG. 17.
Figure 21:
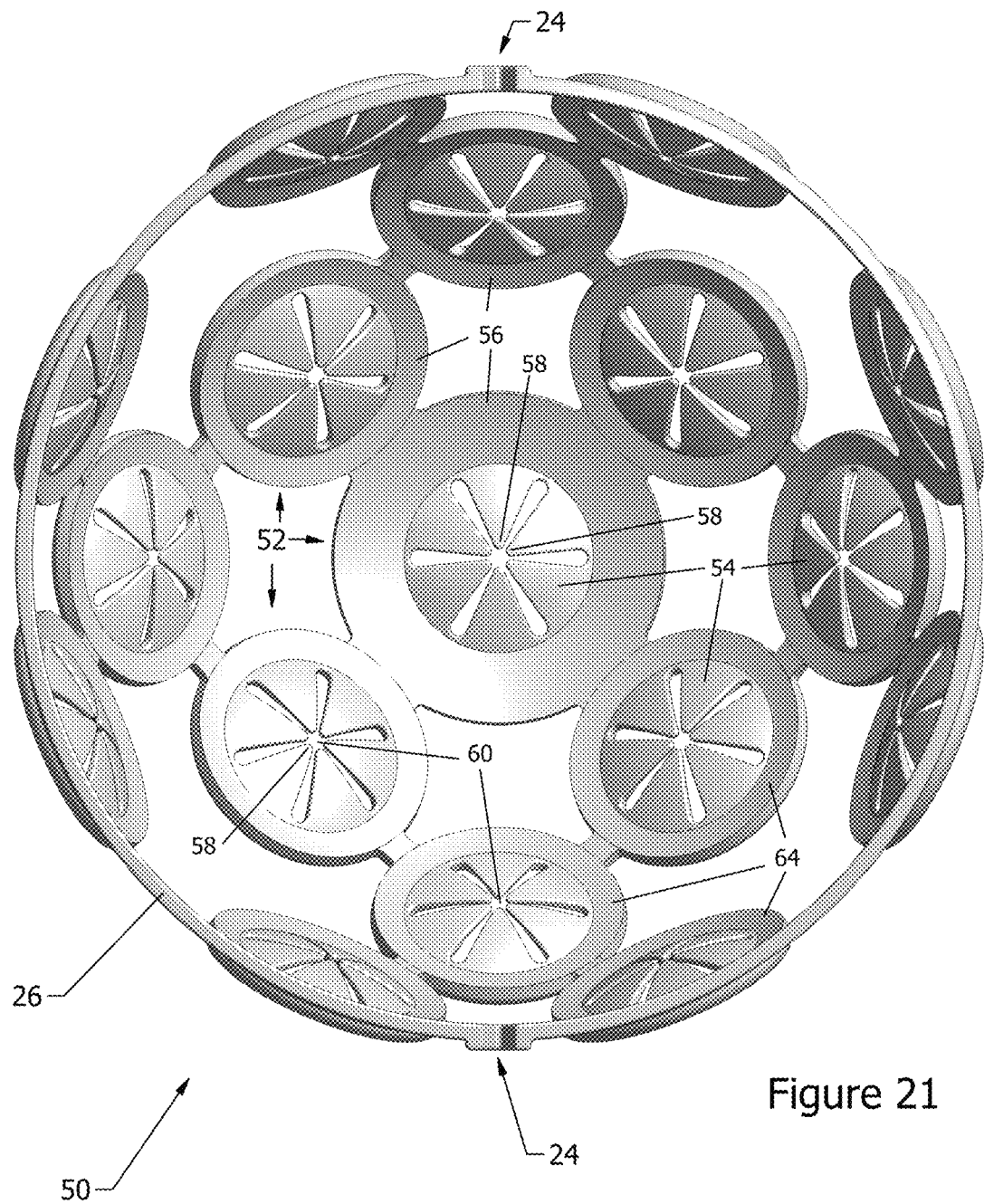
FIG. 21 is a bottom elevation view of the alternative outer portion of FIG. 17.
Figure 36:
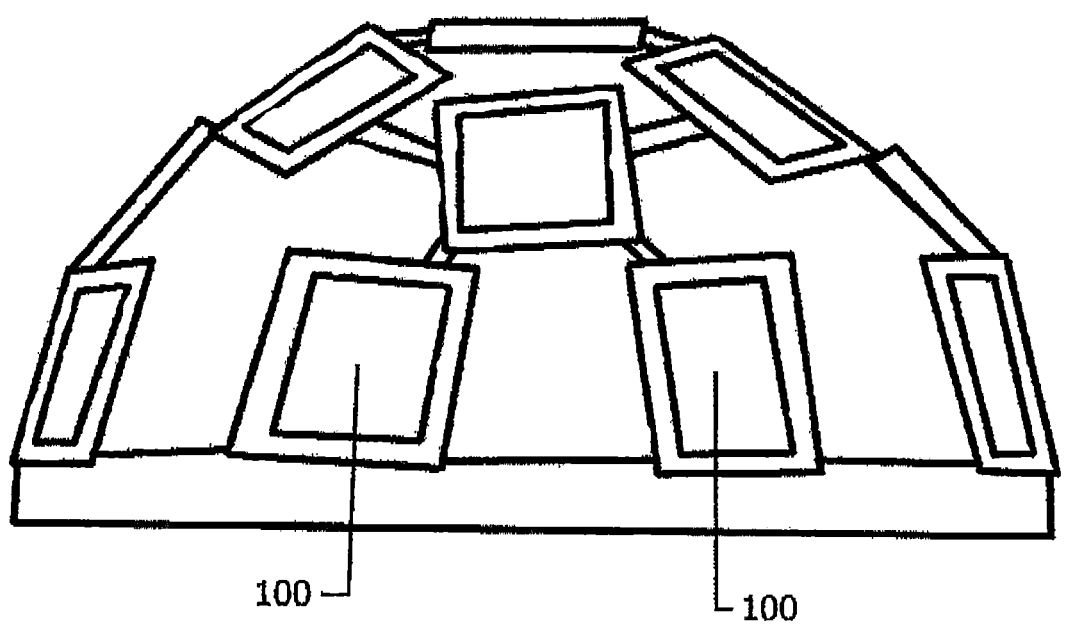
FIG. 36 is the side elevation view of FIG. 12, but with the annular configurations of the stem receiving apertures of FIG. 12 replaced with square configured apertures.
Figure 37:
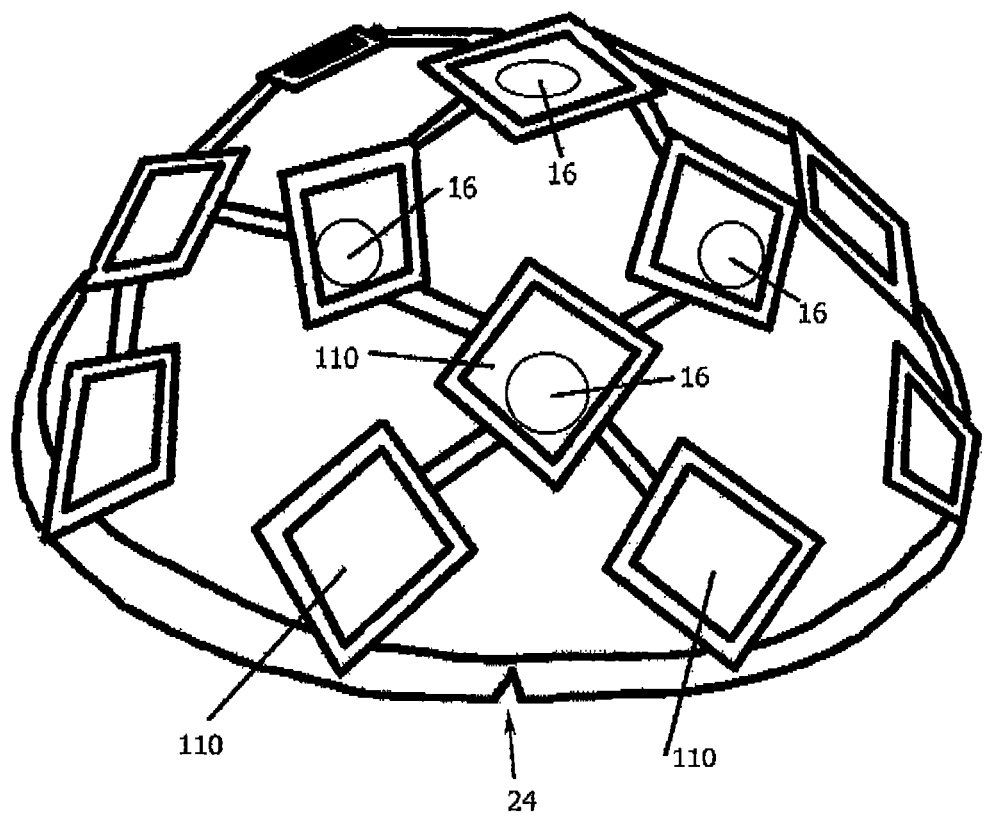
FIG. 37 is the perspective view of an outer portion of the device of FIG. 2, but with "diamond" or "V" configured flower stem receiving apertures in the outer portion of the device in accordance with the present invention.
Figure 38:
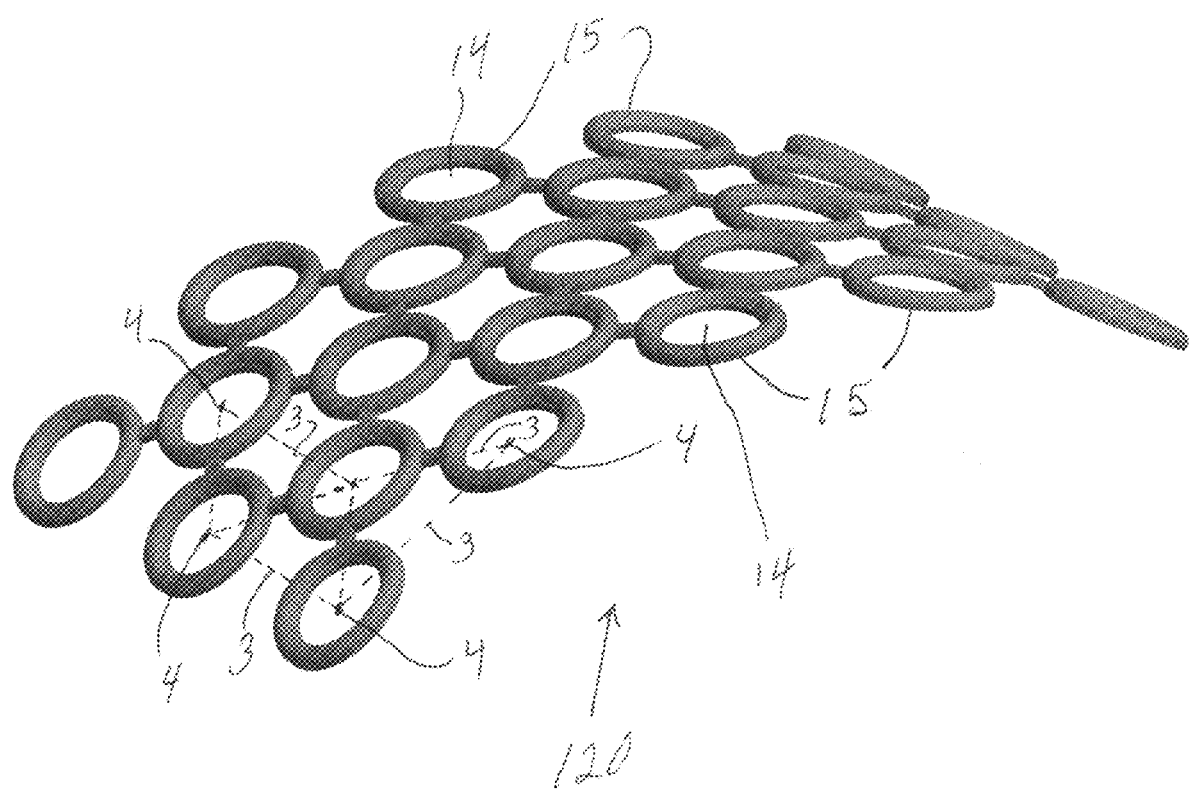
FIG. 38 is a perspective view of an alternative configuration for the outer portion of the device disposed in an arcuate configuration in accordance with the present invention.
Figure 42:
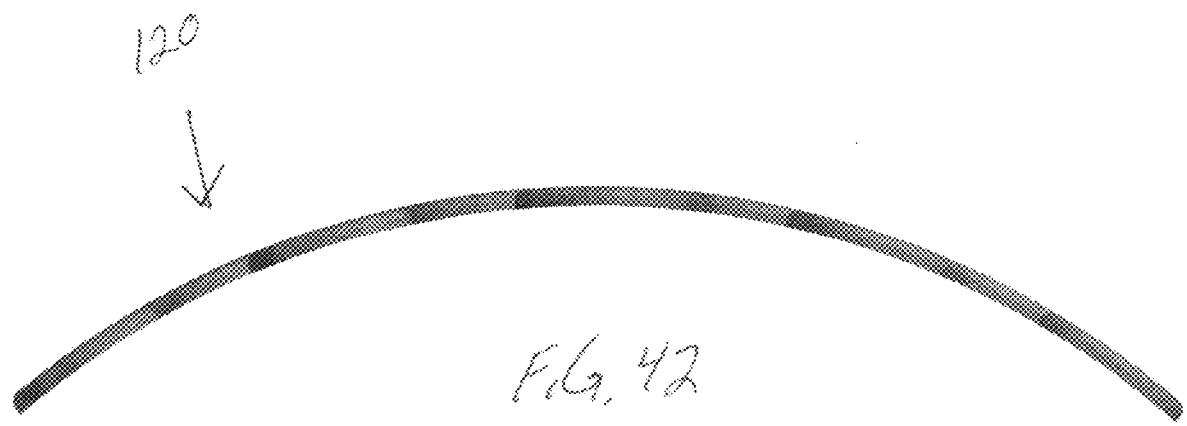
FIG. 42 is a side elevation view of the outer portion of FIG. 41.
Figure 41:
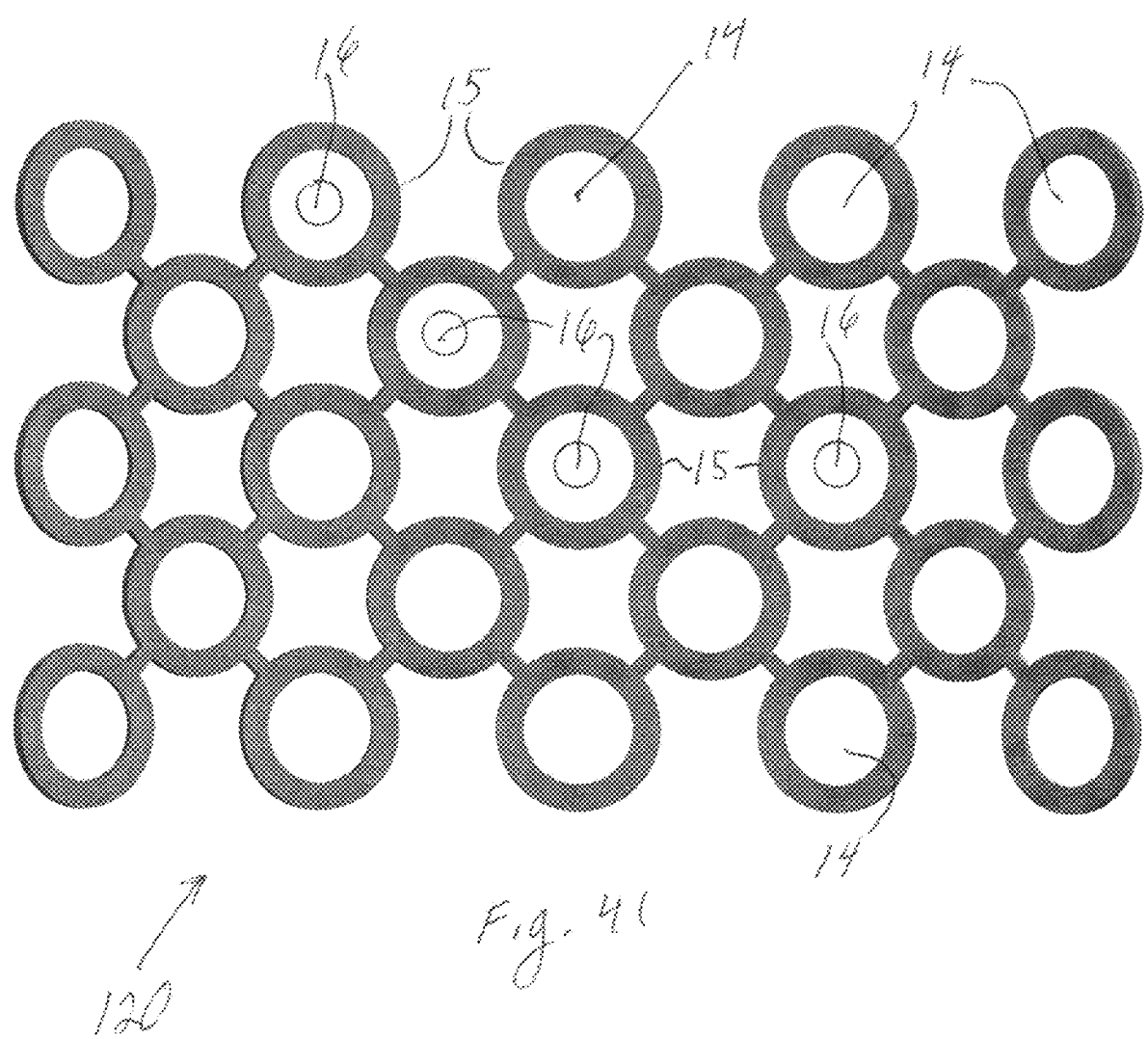
FIG. 41 is a bottom elevation view of the outer portion of FIG. 39.

Referring to FIGS. 8-16, the plurality of annular configured apertures 14 in the outer portion 12 are formed by a predetermined quantity of annular configured stem receiving members 15 integrally joined together via connecting links 17 or at outer annular wall portions 19. The stem receiving members 15 form the apertures 14 that can include a myriad of configurations including, but not limited to annular 14, square 100 (FIG. 36), diamond or "V" 110 (FIG. 37), hexagon and combinations thereof. A relatively larger top stem receiving member 6 (see FIG. 11A) having about the same aperture 14 is configured and dimensioned to enable one stem receiving member to "cover" a relatively large top portion area of the outer portion 12 to promote a uniform distribution of relatively smaller stem receiving members 15. The apertures 14 are sized for a predetermined flower stem portion 16 for a selected flower, which can be naturally grown or manufactured from a selected material such as silk. A method for sizing the apertures 14 is to first determine the cross sectional area of a selected flower stem portion 16, then doubling the cross sectional area of the flower stem portion 16 to determine a "target area" for the apertures 14 of each stem receiving member 15. The cross sectional area of each stem receiving member 15 is depicted (see FIG. 9) for comparison to the diameter of the aperture 14 (see FIG. 8).

Further, the stem receiving members 15 form the outer portion 12 such that a preselected floral design is ultimately configured and dimensioned with little time and effort required from the user by disposing flower stem receiving members 15 such that adjacent receiving members 15 are offset to form a relatively zigzag configuration, thereby avoiding linear rows and columns of receiving members 15 that would result in a floral bouquet 8 displeasing to a viewing audience. One floral design technique includes configuring and dimensioning an outer portion 12 with pre-sized flower stem receiving members 15 integrally joined together such that adjacent stem receiving members 15 form "arcuate triangle" configurations (see dashed lines 3 of FIGS. 31-35) between center points 4 of receiving members 15 in adjacent arcuate rows 5, 7 and 11 of the outer portion 12.

The preferred arcuate triangles 3 are substantially isosceles right triangles formed by the positioning of respective stem receiving members 15 that form the outer surface of the outer portion 12. Alternative triangle configurations (equilateral triangles for example) can be used for varying the arrangement of the flower stem receiving members 15 when changing the flower bouquet 8 design. The triangles 3 separate adjacent members 15 in the same row (row 5 for example) about one-half the outer diameter of a receiving member 15, and separate adjacent members 15 joined together by connecting links 17 in adjacent rows (rows 5 and 7 for example) about one-half the outer diameter of a receiving member 15. Adjacent flower stem receiving members 1 and 2 (see FIG. 31) in the same row (row 5 for example), but not part of the same "triangle" 3 are also separated about one-half the outer diameter of a receiving member 15.

The same method for floral bouquet 8 configuration and dimensioning depicted in FIGS. 31-35 and described above has been incorporated into the alternative outer portion 50 depicted in FIGS. 17-23 and the second alternative outer portion 70 depicted in FIGS. 24-30, except that the dashed lines forming the triangles 3 are not included. Secondary apertures 90 (see FIG. 11A) between adjacent stem receiving members 15, which excludes apertures 14 formed inside the stem receiving members 15, can be used to add more flowers or decorations to the device 10 sufficient to enhance the theme of the flower bouquet 8 being configured.

Referring to FIGS. 38-42, the same floral bouquet 8 configuration and dimensioning method can be used for a relatively "bendable" outer portion 120 manufactured from a flexible polymer. The outer portion 120 includes a planar configuration that is "bendable" into an arcuate configuration, thereby allowing the insertion device 120 to be used to form flower bouquets 8 having relatively planar or arucate designs. The outer portion 120 includes flower stem receiving members 15 that are joined together to form patterns of triangles 3 and annular apertures 14 (see FIGS. 38 and 39) that receive stem portions 16 as described above. The planar insertion device 120 can be disposed upon planar or arcuate deformable inner portion material 18 (not depicted), which is disposed in a base portion 20 (not depicted); whereupon, flower stem portions 16 would be inserted through the apertures 14 of the receiving members 15 and forcibly urged into the deformable inner portion material 18 a selected distance to form a predetermined flower bouquet 8 design.

Referring to FIGS. 17-21, an alternative outer portion design for the above outer portion 12 is depicted in accordance with the present invention and denoted as numeral 50. The deformable inner portion 18 and the base portion 20 as described and depicted above remain the same. The alternative outer portion 50 for the device 10 includes a plurality of flower stem receiving members 52 disposed to ultimately configure a preselected flower bouquet when stem portions 16 of preselected flowers are inserted through the flower stem receiving members 52. The stem receiving members 52 include locking members 54 for securing the position of the flower stem portions 16 relative to the outer portion 50.

The alternative outer portion 50 of the device 10 further includes a substantially hemisphere configuration having a preselected quantity of the stem receiving members 52 disposed to receive a corresponding quantity of flower stem portions 16 inserted through the stem receiving members 52 and into the deformable inner portion 18 a predetermined distance, such that engagement between adjacent flower stem portions 16 is prevented and the insertion depth of each flower stem portion 16 into the deformable inner portion 18 is sufficient to maintain the position of each flower stem portion 16 relative to the inner portion 18.

The locking members 54 are formed via a plurality of apertures 56 that configure the locking members 54 into a substantially triangular configuration having a relatively rounded tip portion 58 that cooperates with adjacent tip portions 58 to form a relatively small aperture 60 for receiving an insertion end 61 of a flower stem portion 16; such that the tip portion 58 engages and retains the flower stem portion 16 when a respective flower stem portion 16 is urged in a direction opposite to the direction of insertion 62 of the stem portion 16, thereby restricting the removal of the flower stem portion 16 from the device 10.

Figure 22:
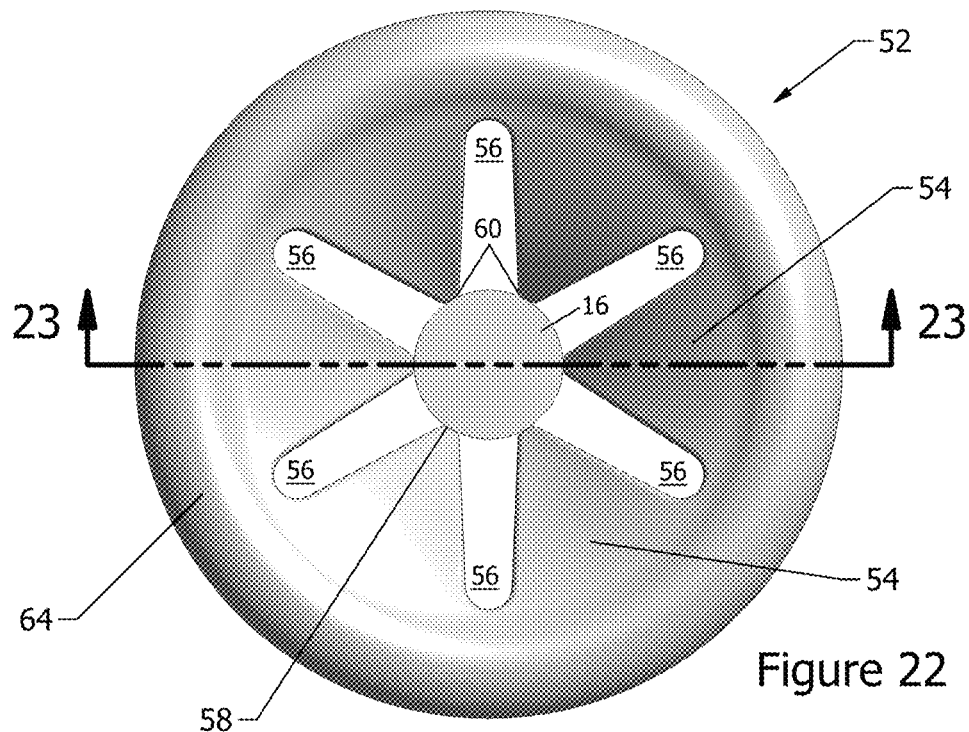
FIG. 22 is a top elevation view of a stem receiving member of the alternative outer portion of FIG. 17.
Figure 23:
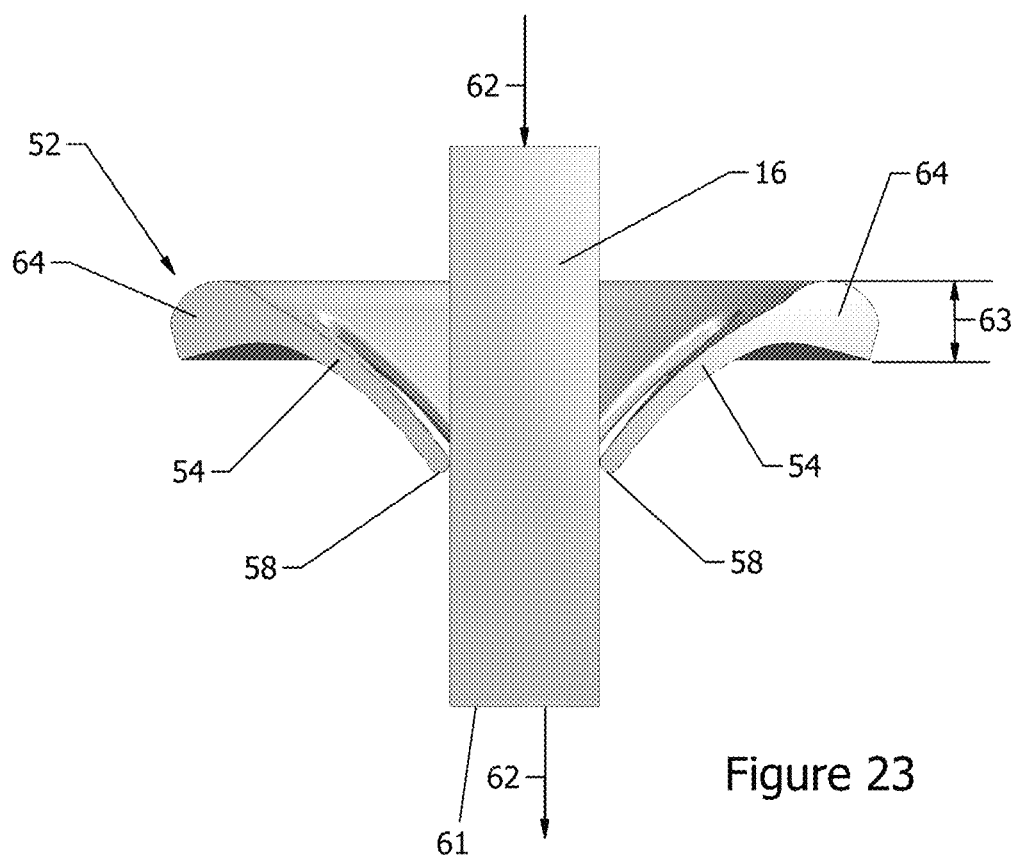
FIG. 23 is a section view taken along line 23-23 of FIG. 22.
Figure 24:
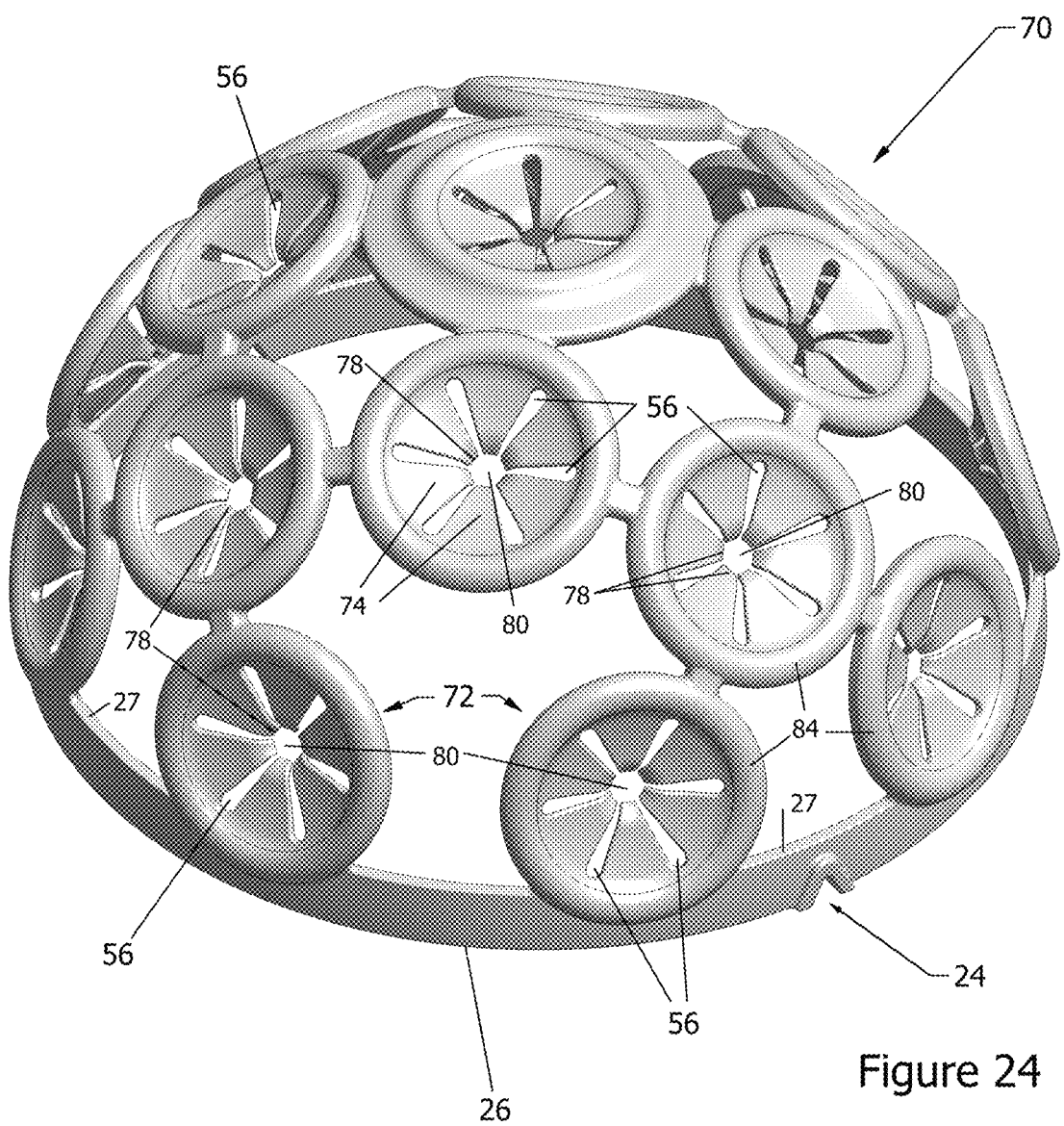
FIG. 24 is a perspective view of a second alternative outer portion for the device of FIG. 1 in accordance with the present invention.
Figure 25:
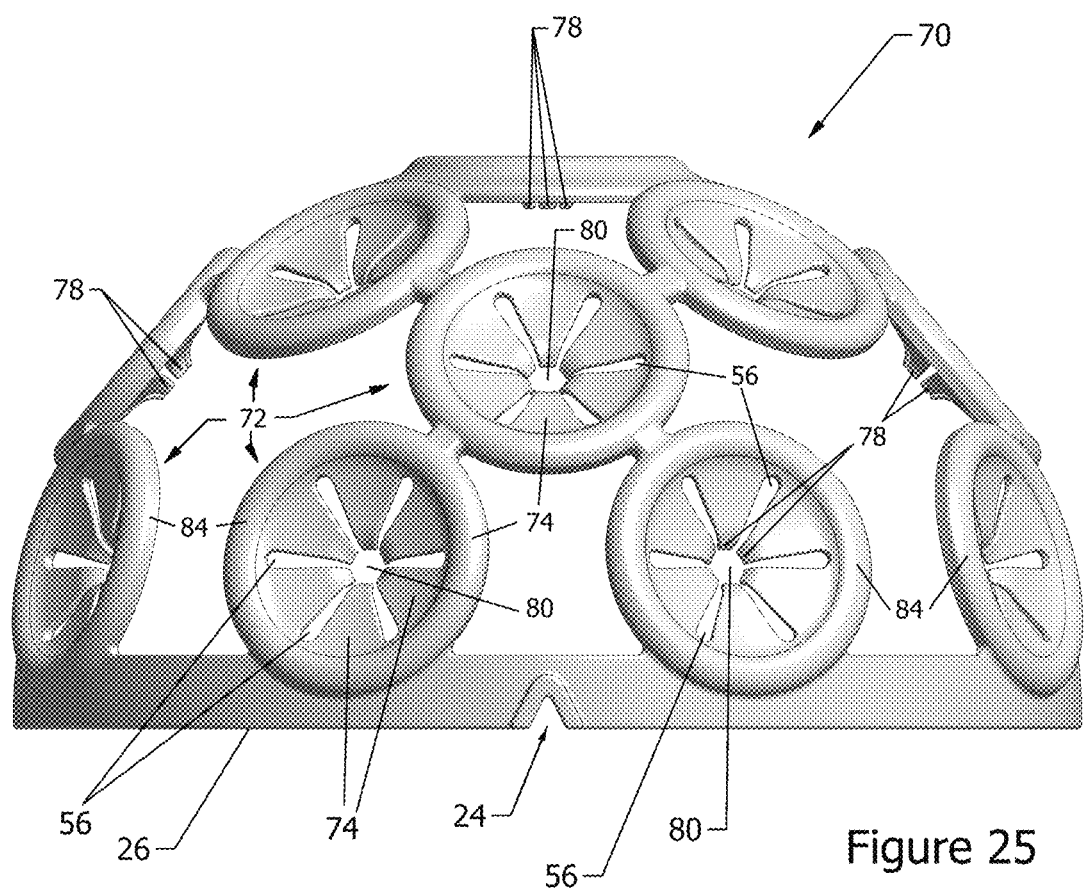
FIG. 25 is a front elevation view of the second alternative outer portion of FIG. 24.
Figure 26:
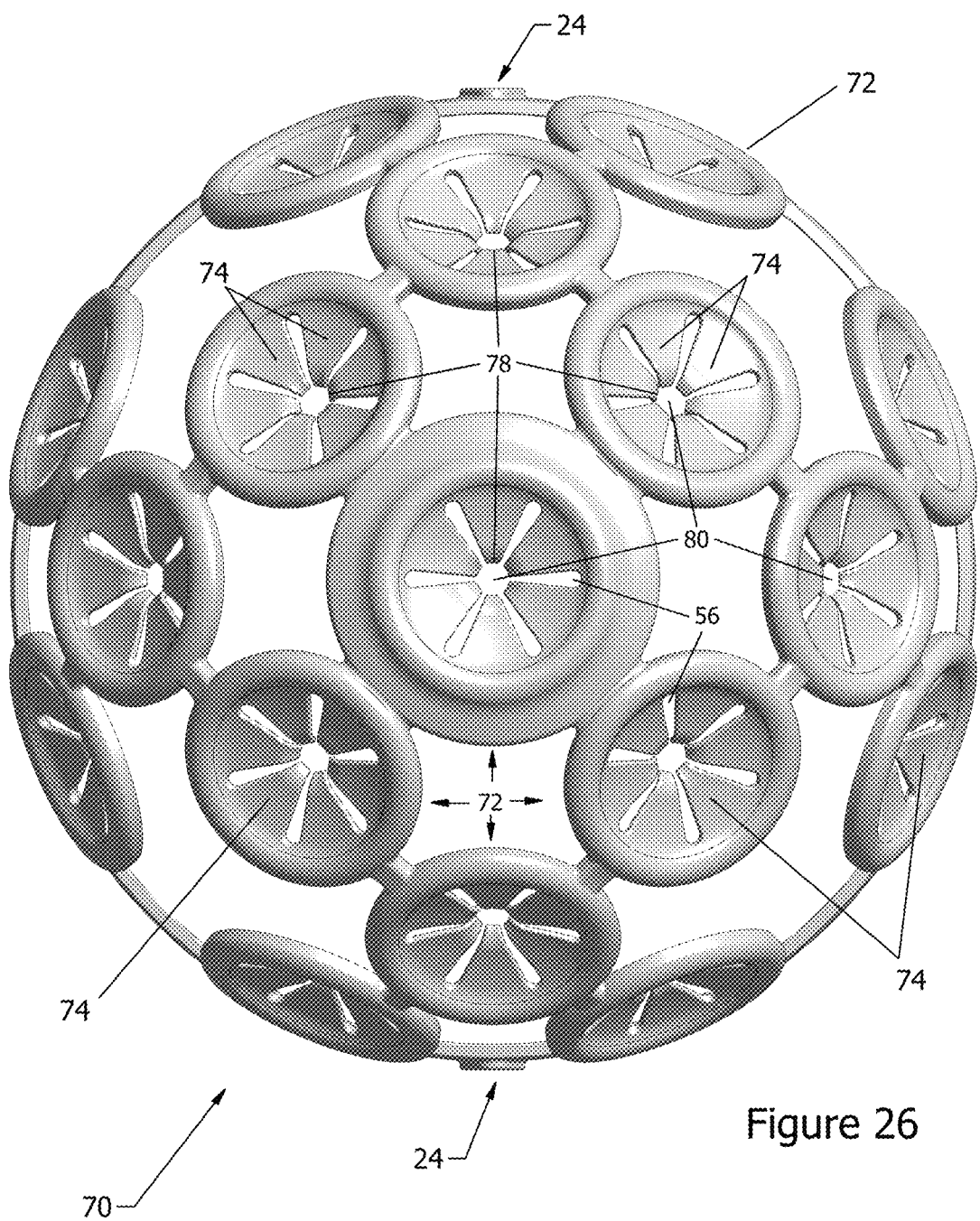
FIG. 26 is a top elevation view of the second alternative outer portion of FIG. 24.
Figure 27:
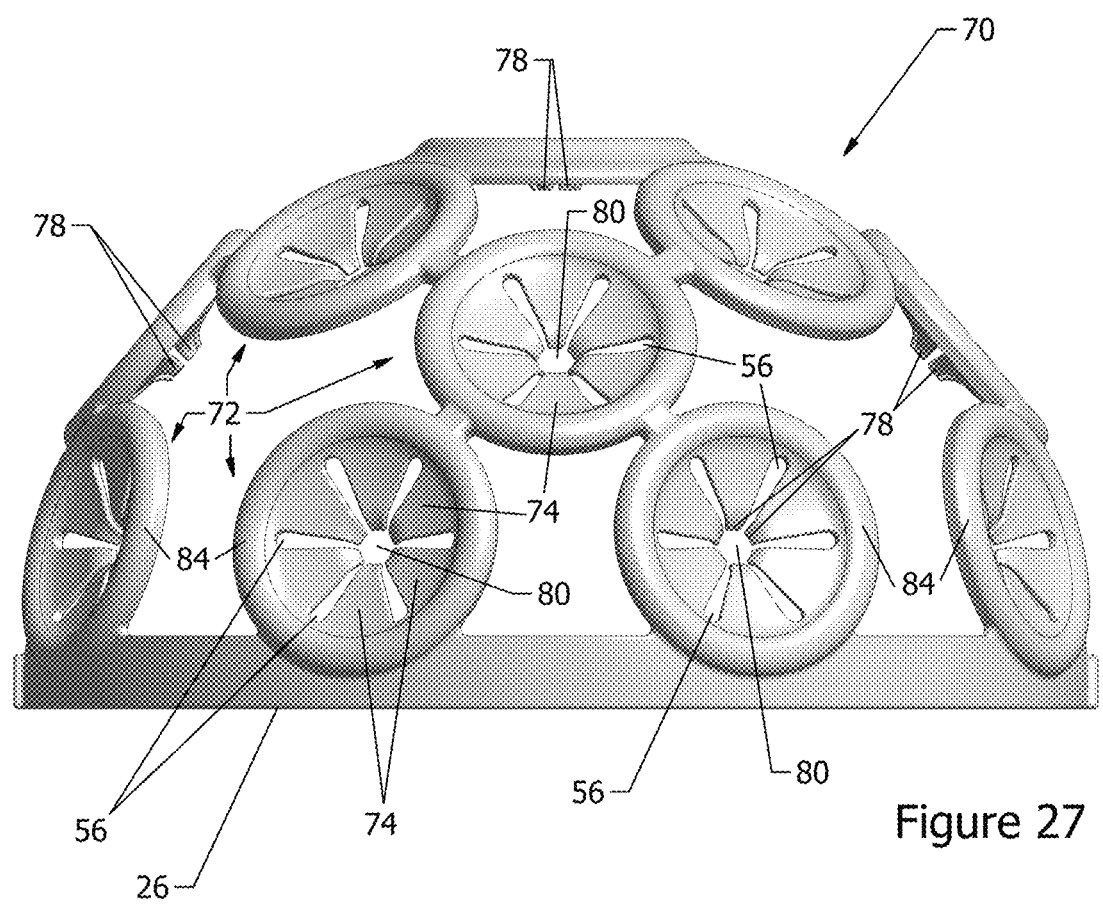
FIG. 27 is a side elevation view of the second alternative outer portion of FIG. 24.
Figure 28:
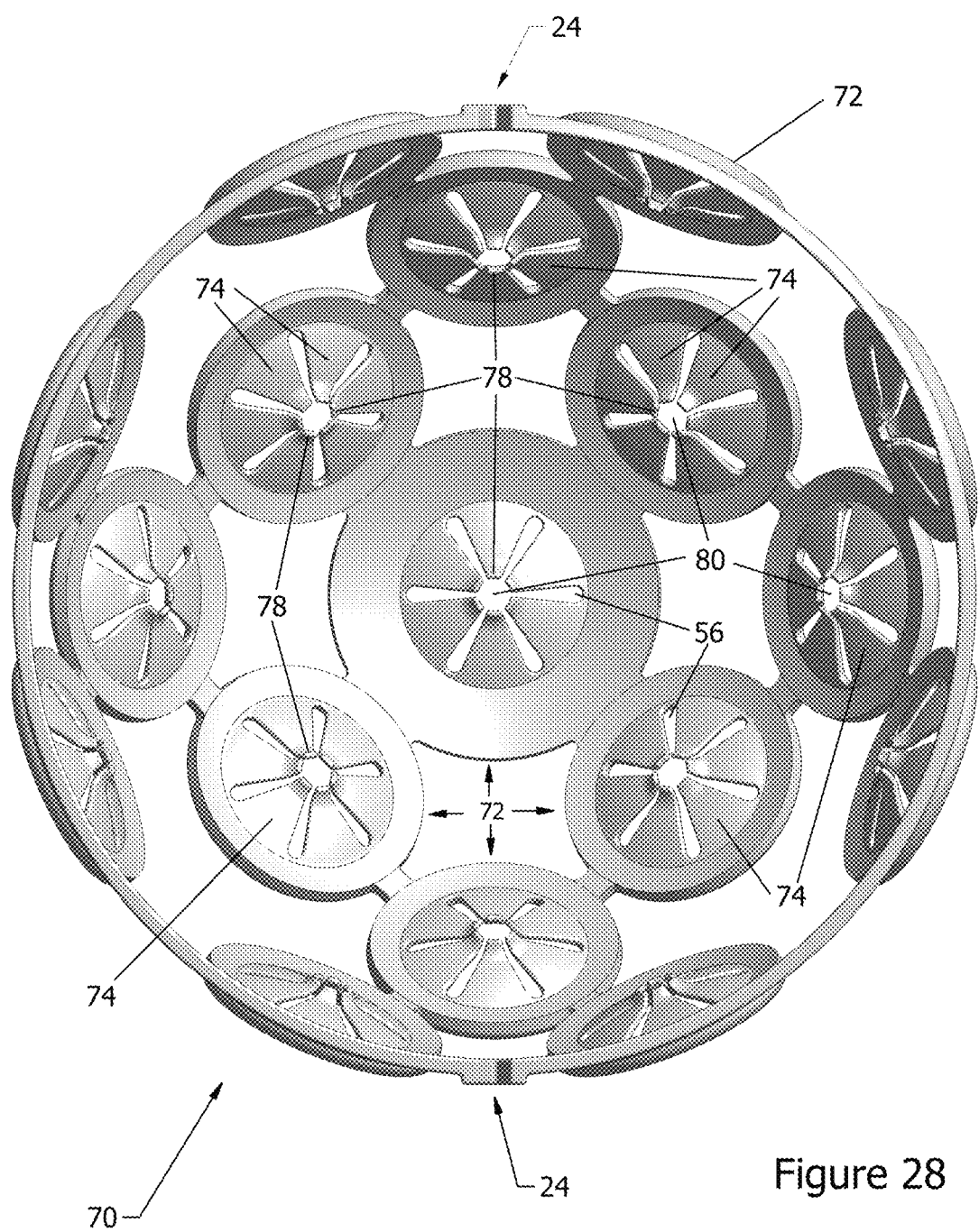
FIG. 28 is a bottom elevation view of the second alternative outer portion of FIG. 24.

Referring to FIGS. 22 and 23, the locking members 54 are relatively "thin" when compared to the "thickness" 63 of the outer ring 64 to which the locking members 54 are integrally joined, resulting in the locking members 54 being flexible to receive and secure the stem portion 16, and the outer ring 64 being more rigid to provide stability for the alternative outer portion 50. The locking members 54 are configured in a concave relationship to the direction of insertion 62 of a flower stem portion 16 through the aperture 60. As a flower stem portion 16 is forcibly inserted through the aperture 60, the tip portion 58 of the locking members 54 "ride" upon the surface of the stem portion 16 until the stem portion 16 is inserted into the deformable inner portion 18 a predetermined distance. Should the stem portion 16 be pulled opposite to the direction of insertion 60, the tip portions 58 would tend to maintain the position of the stem portion 16 relative to the outer portion 12, thereby preventing the unintended removal of the stem portion 16 from the alternative outer portion 50, but not preventing the intentional removal (with sufficient force) of the stem portion 16 from the alternative outer portion 50. One of ordinary skill in the art could configure, construct and dimension the above described locking members 54 such that the locking members 54 can maintain the positions of the stem portions 16 of a selected flower bouquet relative to the outer portion 12 without including the deformable inner portion 18 in the base portion 20. The position of flowers forming the flower bouquet would be maintained relative to the outer portion 12 via the stem portions 16 being secured by the locking members 54 and the insertion ends 61 of the flower stem portions 16 engaging the wall of the recess 22 of the base portion 20.

Referring to FIGS. 24-30, a second alternative outer portion design for the above outer portion 12 is depicted in accordance with the present invention and denoted as numeral 70. The deformable inner portion 18 and the base portion 20 as described and depicted above remain the same. The second alternative outer portion 70 for the device 10 is substantially the same design as the alternative outer portion design 50. The second alternative outer portion 70 includes a plurality of flower stem engagement members 72 disposed to ultimately configure a preselected flower bouquet when stem portions 16 of preselected flowers are inserted through the flower stem engagement members 72. The stem engagement members 72 include stem engagement portions 74 for securing the position of the flower stem portions 16 relative to the outer portion 70.

The second alternative outer portion 70 of the device 10 further includes a substantially hemisphere configuration having a preselected quantity of the stem engagement members 72 disposed to receive a corresponding quantity of flower stem portions 16 inserted through the stem engagement members 72 and into the deformable inner portion 18 a predetermined distance, such that engagement between adjacent flower stem portions 16 is prevented and the insertion depth of each flower stem portion 16 into the deformable inner portion 18 is sufficient to maintain the position of each flower stem portion 16 relative to the inner portion 18.

The stem engagement members 72 of the second alternative outer portion 70 differ from the stem receiving members 52 of the alternative outer portion 50 due to the stem engagement portions 74 having a triangular configuration that includes a relatively blunt, inwardly curved tip portion 78 that arcuately engages a surface portion of a respective flower stem portion 16, thereby separating edge portions of the stem engagement members 72 from surface portions of the flower stems portions 16 and enabling the extraction of flower stem portions 16 from corresponding engagement members 72 and the deformable inner portion 18 with a relatively small amount of manual force. The stem engagement portions 74 and tip portions 78 cooperate to form a relatively small aperture 80 having a cross sectional area smaller than the cross sectional area of a flower stem portion 78 forcibly inserted through the aperture 80 via an insertion end 81 of a flower stem portion 16; whereupon, the blunt curved tip portion 78 arcuately engages the flower stem portion 16 and minimally restricts the movement of a respective flower stem portion 16 urged in a direction 82 opposite to the direction of insertion of the stem portion 16, thereby promoting the removal of the flower stem portion 16 from the device 10 without damage to the flower stem portion 16 and with less manual force than the force required to remove a flower stem portion 16 from the alternative outer portion design 50.

Figure 29:
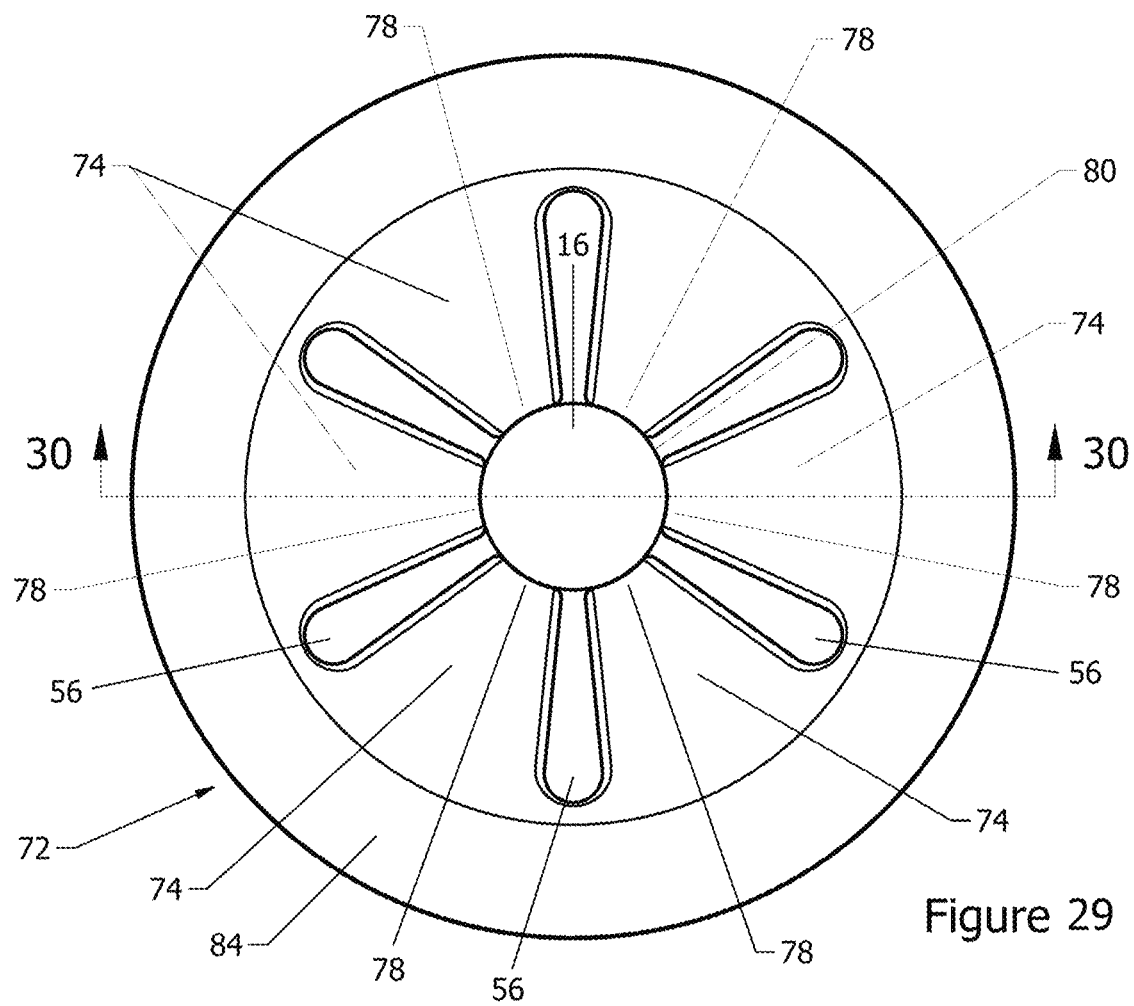
FIG. 29 is a top elevation view of a stem receiving member of the second alternative outer portion of FIG. 24.
Figure 30:
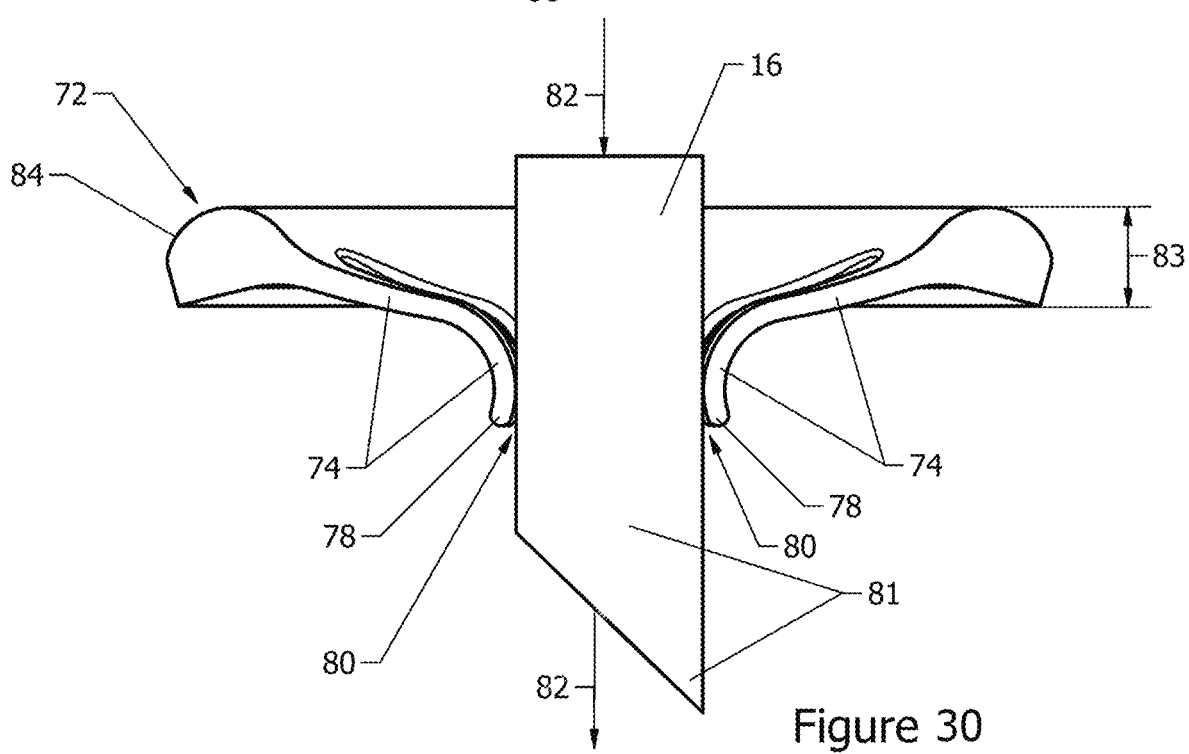
FIG. 30 is a sectional view taken along 30-30 of FIG. 29.
Figure 31:
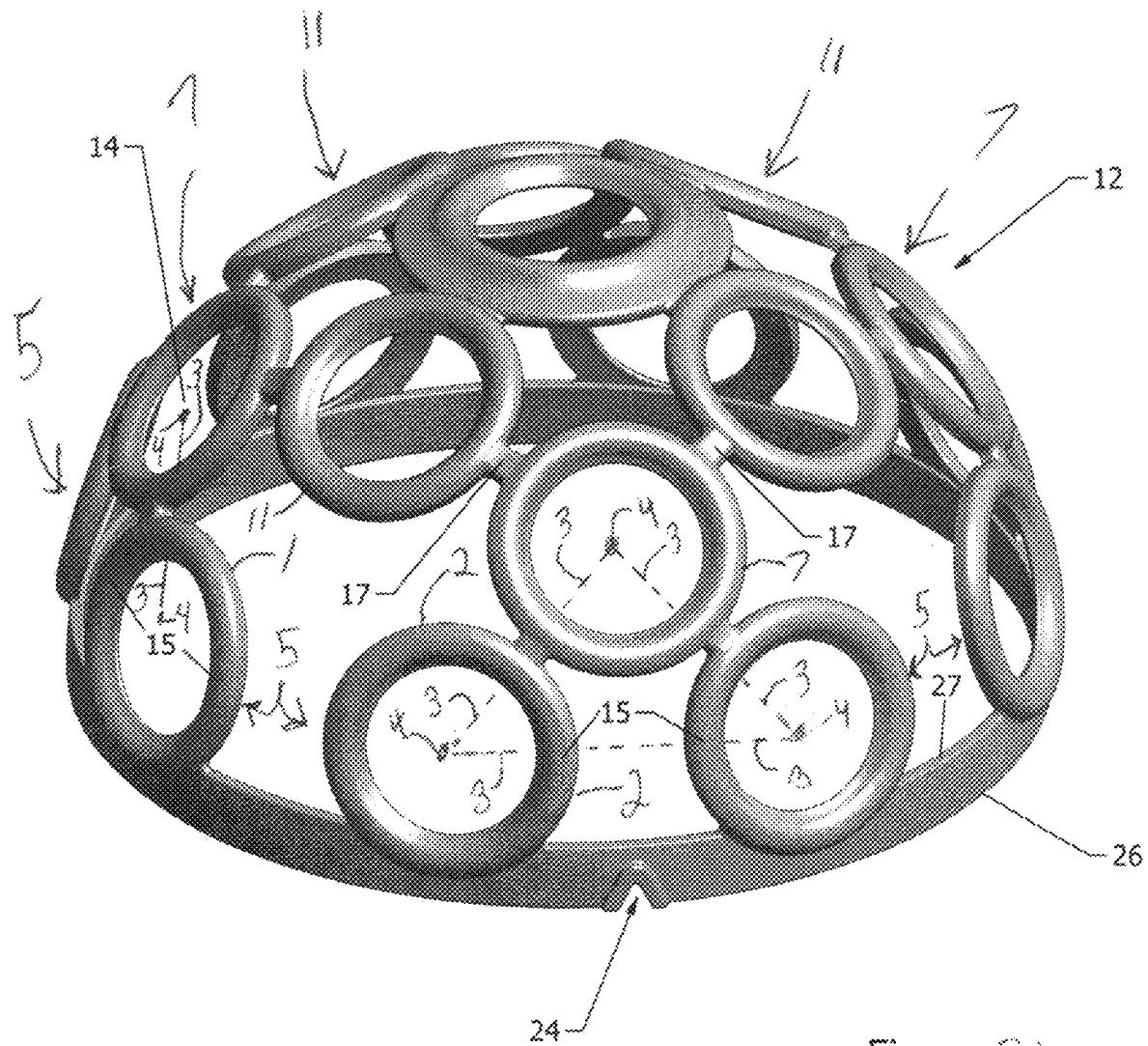
FIG. 31 is the perspective view of FIG. 2, but with a triangle configuration added in dashed lines to identify the triangle configuration grouping of the flower stem receiving members in accordance with the present invention.
Figure 32:
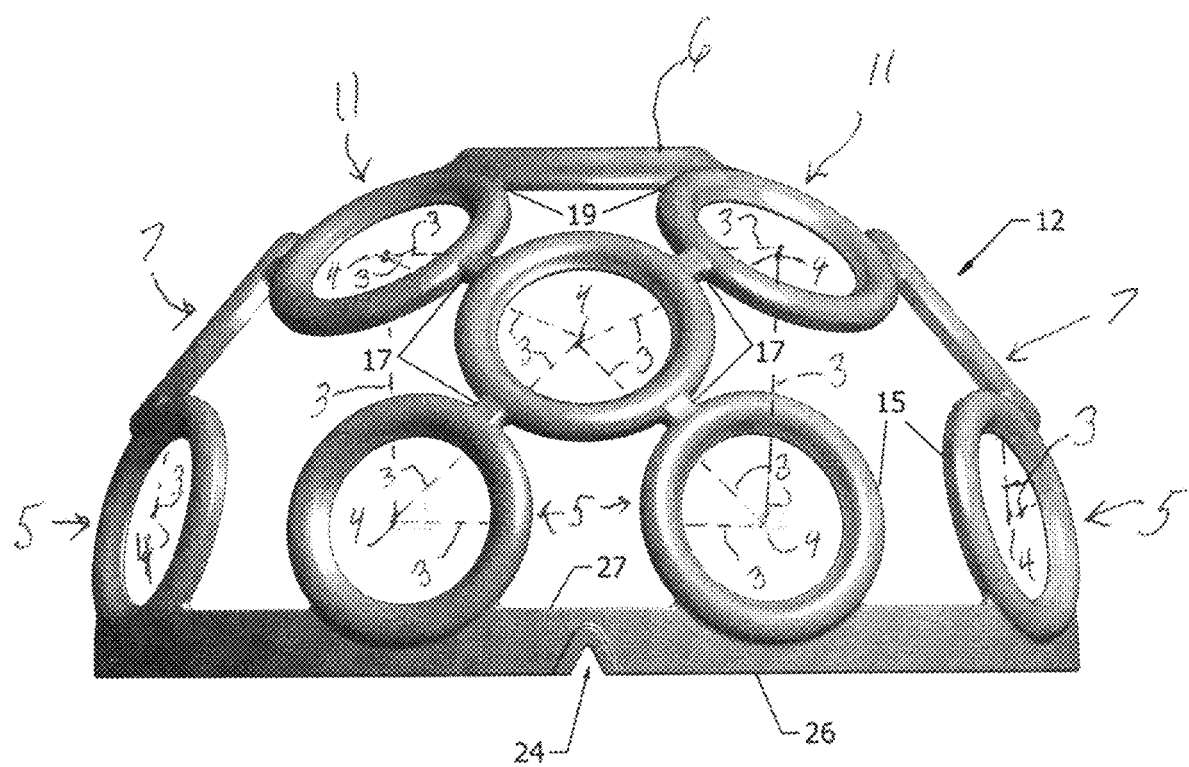
FIG. 32 is the front elevation view of FIG. 10, but with dashed lines added to identify the triangle configuration grouping of the flower stem receiving members.
Figure 33:
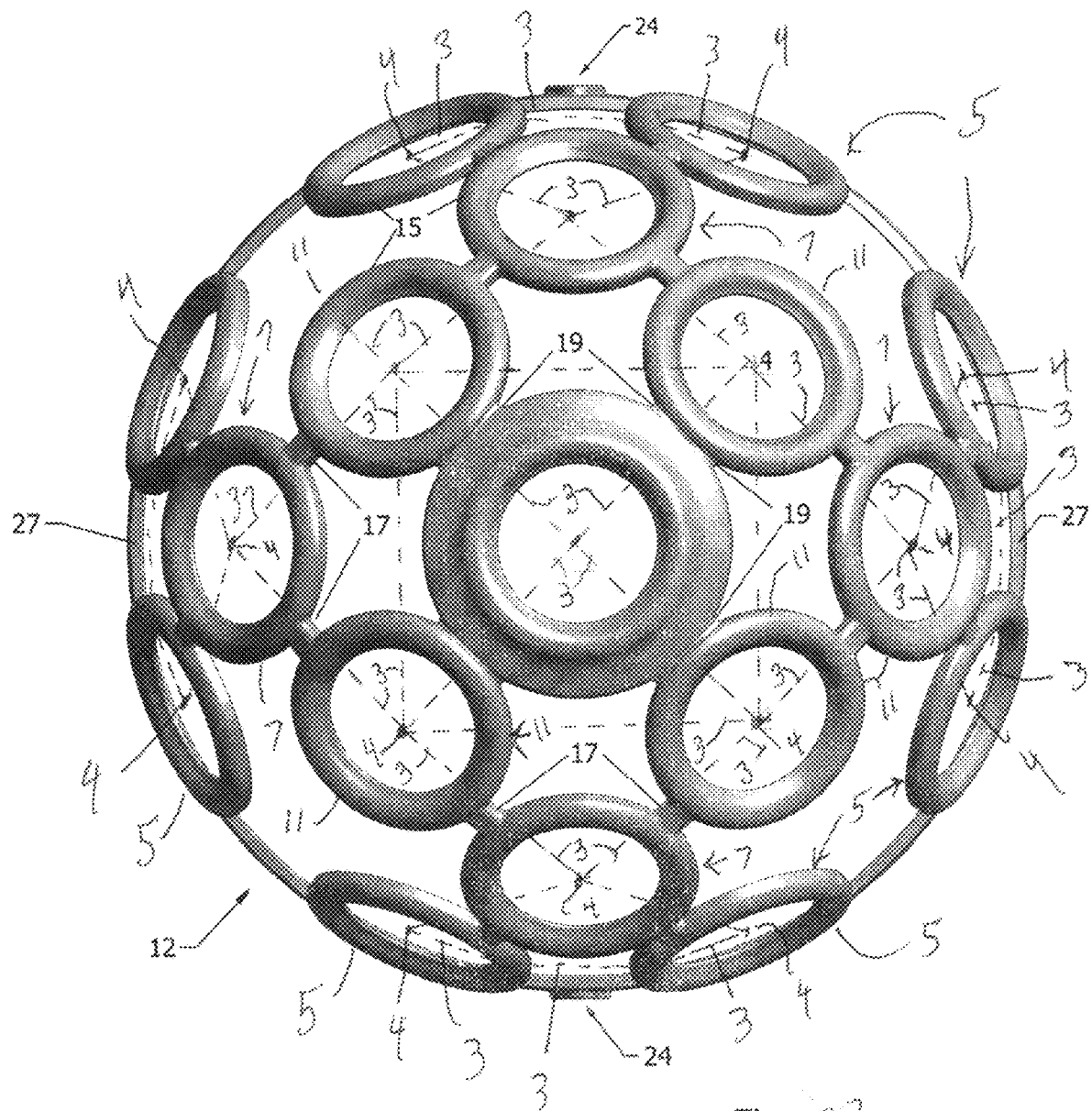
FIG. 33 is the top elevation view of FIG. 11, but with dashed lines added to identify the triangle configuration grouping of the flower stem receiving members.
Figure 34:
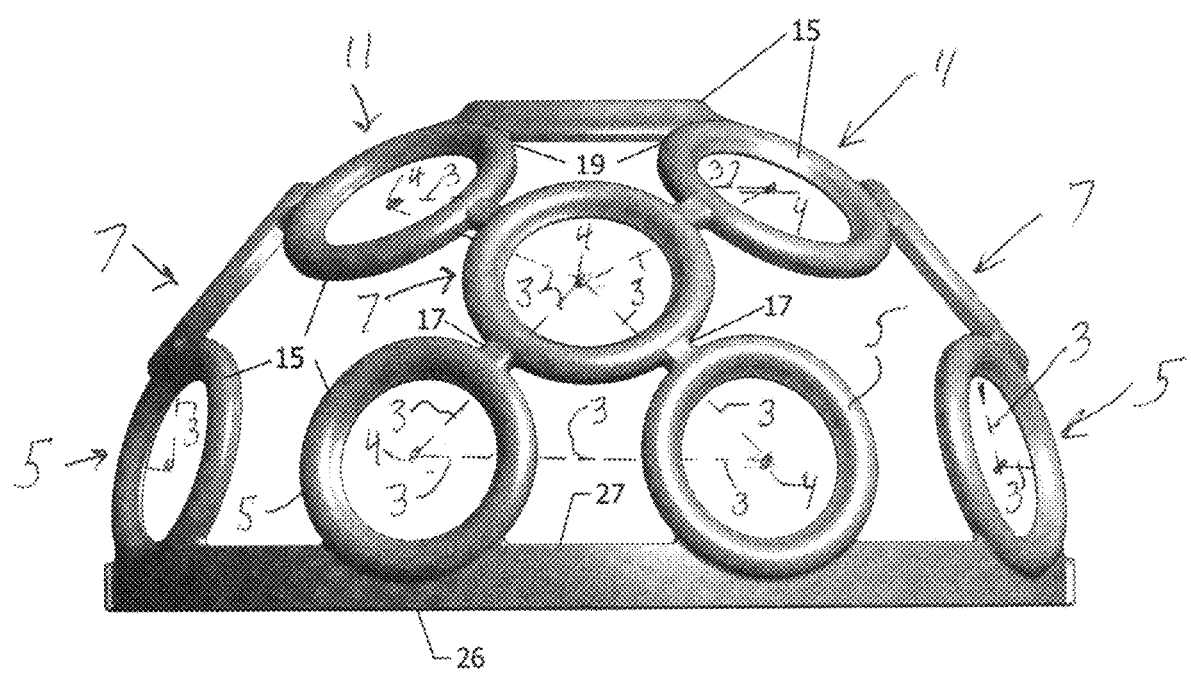
FIG. 34 is the side elevation view of FIG. 12, but with dashed lines added to identify the triangle configuration grouping of the flower stem receiving members.
Figure 35:
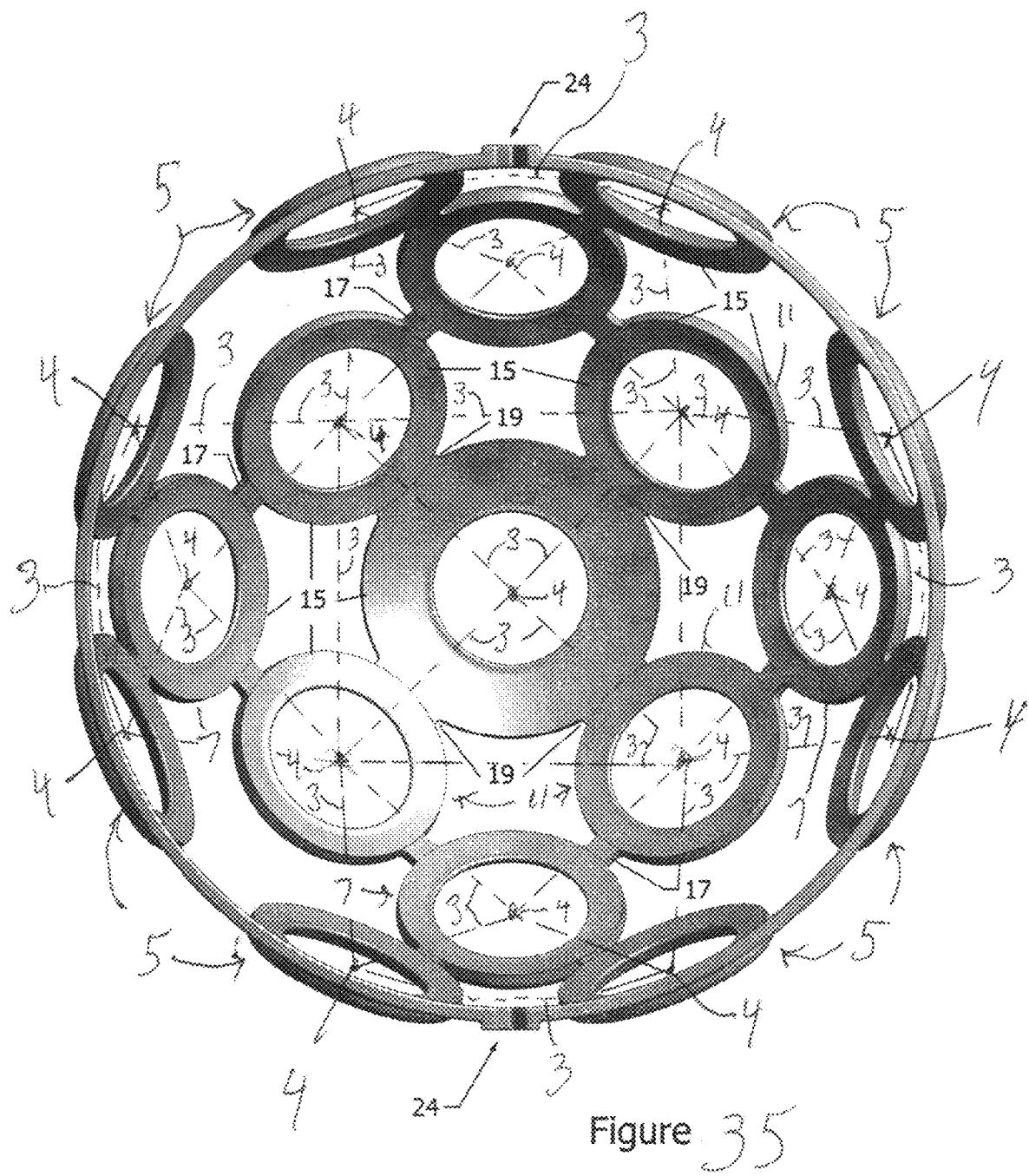
FIG. 35 is the bottom elevation view of FIG. 13, but with dashed lines added to identify the triangle configuration grouping of the flower stem receiving members.

Referring to FIGS. 29 and 30, the stem engagement members 74 are relatively "thin" when compared to the thickness 83 of the outer ring 84 to which the locking members 74 are integrally joined, resulting in the engagement members 74 being flexible to receive and secure the stem portion 16, and the outer ring 84 being more rigid to provide stability for the second alternative outer portion 70. The engagement members 74 are configured in a concave relationship to the direction of insertion 82 of a flower stem portion 16 through the aperture 80. As a flower stem portion 16 is forcibly inserted through the aperture 80, the tip portion 78 of the stem engagement members 74 ride upon the surface of the stem portion 16 until the stem portion 16 is inserted into the deformable inner portion 18 a predetermined distance. Should the stem portion 16 be pulled opposite to the insertion direction of the stem portion 16, the inwardly curved tip portions 78 would not prevent movement of the stem portion 16 in either the insertion or extraction direction, but instead would minimally restrict extraction of the stem portion 16 from the aperture 80, thereby allowing the extraction of the stem portion 16 from the second alternative outer portion 70 without damage to the stem portion 16.

The foregoing description is for the purpose of illustration only and is not intended to limit the scope of protection accorded this invention. The scope of protection is to be measured by the following claims, which should be interpreted as broadly as the inventive contribution permits.

The invention claimed is:

1. A flower stem insertion device for forming flower bouquets comprising:
an outer portion having a substantially hemisphere configuration formed from a plurality of arcuate stem receiving members with apertures disposed to ultimately configure a preselected flower bouquet when stem portions of preselected flowers are inserted through said apertures, said stem receiving members being arcuately joined together via connecting links, whereby adjacent arcuate stem receiving members form arcuate triangle configurations between center points of said stem receiving members in adjacent arcuate rows and arcuate columns of said hemisphere configured outer portion, thereby providing non-linear rows and non-linear columns of receiving members for correspondingly offsetting received preselected flowers, resulting in a relatively hemisphere configured flower bouquet;

a deformable inner portion configured to cooperate with said outer portion such that when the stem portions of the preselected flowers are ultimately inserted through said apertures, the stem portions penetrate said deformable inner portion a predetermined distance sufficient to maintain the position of each of the preselected flowers relative to said outer portion; and a base portion having a recess for receiving said deformable inner portion;

whereupon said base portion is detachably secured to said outer portion, thereby securing the position of said deformable inner portion relative to said outer portion and said base portion, whereby the stem portions penetrating said deformable inner portion the predetermined distance sufficient to maintain the position of each of the preselected flowers relative to said outer portion ultimately configure the preselected flower bouquet that covers said outer and inner portions, thereby enabling a user to form a preselected flower bouquet having a constant hemispheric periphery.

2. The device of claim 1 wherein said outer portion includes a recess in a bottom edge portion that ultimately engages a protrusion member integrally joined to an outer edge portion of said base portion, thereby preventing rotation of said outer portion upon said outer edge portion of said base portion.

3. The device of claim 2 wherein said base portion includes clamp members integrally joined to an inner edge portion of said base portion, said clamp members being configured and dimensioned to secure said bottom edge portion of said outer portion upon a top wall of said outer edge portion of said base portion.

4. The device of claim 3 wherein said clamp members detachably secure said bottom edge portion of said outer portion upon said top wall of said outer edge portion of said base portion.

5. The device of claim 1 wherein said base portion includes a handle portion.

6. The device of claim 5 wherein said handle portion is detachably secured to said base portion.

7. The device of claim 1 wherein said arcuate triangle configurations include equilateral triangle configurations formed by separating adjacent arcuate stem receiving members disposed in the same row about one-half the outer diameter of either of said arcuate stem receiving member, and separating adjacent arcuate stem receiving members in adjacent columns about one-half the outer diameter of either of said adjacent arcuate stem receiving member, thereby providing non-linear rows and non-linear columns of arcuate stem receiving members for correspondingly offsetting the preselected flowers.

8. The device of claim 7 wherein said adjacent arcuate stem receiving members disposed in the same row, are disposed in respective adjacent arcuate triangle configurations of said arcuate stem receiving members, whereby said adjacent arcuate stem receiving members disposed in the same row and disposed in respective adjacent arcuate triangle configurations are separated about one-half the outer diameter of either of said adjacent arcuate stem receiving members.

* * * * *